US012124922B2

(12) United States Patent
Smelyanskiy et al.

(10) Patent No.: US 12,124,922 B2
(45) Date of Patent: Oct. 22, 2024

(54) NON-ADIABATIC IMPLEMENTATION OF AN ISWAP QUANTUM LOGIC GATE

(71) Applicant: Google LLC, Mountain View, CA (US)

(72) Inventors: Vadim Smelyanskiy, Mountain View, CA (US); Andre Petukhov, Rapid City, SD (US); Rami Barends, San Diego, CA (US); Sergio Boixo Castrillo, Rancho Palos Verdes, CA (US); Yu Chen, Goleta, CA (US)

(73) Assignee: Google LLC, Mountain View, CA (US)

( * ) Notice: Subject to any disclaimer, the term of this patent is extended or adjusted under 35 U.S.C. 154(b) by 515 days.

(21) Appl. No.: 17/433,445

(22) PCT Filed: Mar. 5, 2019

(86) PCT No.: PCT/US2019/020661
§ 371 (c)(1),
(2) Date: Aug. 24, 2021

(87) PCT Pub. No.: WO2020/180297
PCT Pub. Date: Sep. 10, 2020

(65) Prior Publication Data
US 2022/0027773 A1    Jan. 27, 2022

(51) Int. Cl.
*G06N 10/00*    (2022.01)

(52) U.S. Cl.
CPC .................. *G06N 10/00* (2019.01)

(58) Field of Classification Search
USPC ........................................... 716/100
See application file for complete search history.

(56) References Cited

U.S. PATENT DOCUMENTS

| 2014/0264285 A1* | 9/2014 | Chow | .................. B82Y 10/00 257/31 |
| 2018/0260732 A1* | 9/2018 | Bloom | .................. G06N 10/40 |

OTHER PUBLICATIONS

CA Office Action in Canadian Appln. No. 3,129,063, dated Oct. 26, 2022, 4 pages.
International Preliminary Report on Patentability in International Appln. No. PCT/US2019/020661, dated Sep. 16, 2021, 9 pages.
Office Action in Australian Appln. No. 2019433194, dated Aug. 17, 2022, 2 pages.

(Continued)

*Primary Examiner* — Bryce M Aisaka
(74) *Attorney, Agent, or Firm* — Fish & Richardson P.C.

(57) ABSTRACT

Methods, systems and apparatus for generating plunge schedules for implementing iSWAP quantum logic gates between a first qubit and a second qubit. In one aspect, a plunge schedule that defines a trajectory of a detuning between a frequency of the first qubit and a frequency of the second qubit includes, during a first stage, non-adiabatically driving detuning between the frequency of the first qubit and the frequency of the second qubit through a first avoided crossing in a leakage channel, during a second stage, driving detuning between the frequency of the first qubit and the frequency of the second qubit through a second avoided crossing in a swap channel. during a third stage, allowing the first qubit and the second qubit to freely evolve and interact, during a fourth stage, implementing the second stage in reverse order, and during a fifth stage, implementing the first stage in reverse order.

20 Claims, 16 Drawing Sheets

(56) References Cited

OTHER PUBLICATIONS

Chen et al., "Nonadiabatic geometric quantum computation with parametrically tunable coupling" arXiv, 2018, 11 pages.

PCT International Search Report and Written Opinion in International Application No. PCT/US2019/020661, dated Nov. 28, 2019, 15 pages.

Schmitt, "Design, fabrication and test of a four superconducting quantum-bit processor" UPMC, 2015, 161 pages.

Office Action in European Appln. No. 19712359.9, mailed on Aug. 8, 2023, 10 pages.

Barends et al., "Superconducting quantum circuits at the surface code threshold for fault tolerance," Nature, Apr. 23, 2014, 508(7497):500-503.

Berry, "Histories of adiabatic quantum transitions," Proc. Roy. Soc. Lond. A, May 8, 1990, 12 pages.

Ghosh et al., "High-fidelity controlled-$\sigma Z$ gate for resonator-based superconducting quantum computers," Phys. Rev. A, Feb. 8, 2013, 19 pages.

Neill et al., "A blueprint for demonstrating quantum supremacy with superconducting qubits," Science, Apr. 13, 2018, 360(6385):195-199.

Nielsen, "A simple formula for the average gate fidelity of a quantum dynamical operation," Physics Letters A, Oct. 21, 2002, 303(4):249-252.

Rabi et al., "Use of Rotating Coordinates in Magnetic Resonance Problems," Rev. Mod. Phys., Apr. 1, 1954, 5 pages.

Roland et al., "Quantum search by local adiabatic evolution," Phys. Rev. A, Mar. 26, 2002, 6 pages.

Rosen et al., "Double Stern-Gerlach Experiment and Related Collision Phenomena," Phys. Rev., May 15, 1932, 6 pages.

Roth et al., "Analysis of a parametrically driven exchange-type gate and a two-photon excitation gate between superconducting qubits," Phys. Rev. A, Dec. 20, 2017, 9 pages.

Strauch et al., "Quantum Logic Gates for Coupled Superconducting Phase Qubits," Phys. Rev. Lett., Oct. 16, 2003, 4 pages.

\* cited by examiner

NON-ADIABATIC IMPLEMENTATION OF AN ISWAP QUANTUM LOGIC GATE

CROSS-REFERENCE TO RELATED APPLICATION

This application is a National Stage Application under 35 U.S.C. § 371 and claims the benefit of International Application No. PCT/US2019/020661, filed Mar. 5, 2019. The disclosure of the foregoing application is hereby incorporated by reference in its entirety.

BACKGROUND

This specification relates to quantum information processing.

SUMMARY

This specification describes technologies for implementing iSWAP logic gates in quantum computers.

In general, one innovative aspect of the subject matter described in this specification can be implemented in a method for implementing an iSWAP quantum logic gate between a first qubit and a second qubit, the method comprising: implementing a plunge schedule that defines a trajectory of a detuning between a frequency of the first qubit and a frequency of the second qubit, comprising: during a first stage, non-adiabatically driving detuning between the frequency of the first qubit and the frequency of the second qubit through a first avoided crossing in a leakage channel; during a second stage, driving detuning between the frequency of the first qubit and the frequency of the second qubit through a second avoided crossing in a swap channel; during a third stage, allowing the first qubit and the second qubit to freely evolve and interact; during a fourth stage, implementing the second stage in reverse order; and during a fifth stage, implementing the first stage in reverse order.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the plunge schedule is based on a trapezoidal ramp function characterized by a ramp-up time, hold time and the variance of a Gaussian filter function.

In some implementations the method further comprises generating the plunge schedule, comprising: determining a pulse for: the detuning between the frequency of the first qubit and the frequency of the second qubit, the frequency of the first qubit, and the frequency of the second qubit.

In some implementations generating the plunge schedule further comprises synchronizing errors in the swap channel and the leakage channel.

In some implementations the pulse determined for the frequency of the first qubit is equal to a sum of the determined pulse for the second qubit added to the determined detuning pulse.

In some implementations the frequency of the first qubit is dependent on an asymmetry parameter that is equal to the difference between an interaction frequency minus an initial frequency of second qubit, divided by an idling detuning.

In some implementations the pulse determined for the frequency of the second qubit is equal to $$\omega_2(t) = \omega_q + \left(\omega_i + \frac{\mu}{2} - \omega_q\right) f_{ramp}(t)$$

where $\omega_q$ represents an initial frequency of the second qubit, $\omega_i$ represents an interaction frequency, $\mu$ represents an overshoot frequency and $f_{ramp}(t)$ represents the trapezoidal ramp function.

In some implementations the pulse determined for the detuning is equal to $\epsilon(t) = \epsilon_0[1-f_{ramp}(t)] - \mu f_{ramp}(t)$ where $\epsilon_0$ represents initial detuning, $\mu$ represents an overshoot frequency and $f_{ramp}(t)$ represents the trapezoidal ramp function.

In some implementations synchronizing errors in the swap channel and leakage channel comprises determining a trajectory of the detuning between the frequency of the first qubit and the frequency of the second qubit for a complete population swap and minimizing the leakage channel error for that trajectory via a time-dependent inter-qubit interaction strength.

In some implementations the inter-qubit interaction strength is directly proportional to the square root of the product of the frequency of the first qubit and the frequency of the second qubit.

In some implementations synchronizing errors in the swap channel and the leakage channel comprises adjusting: an interaction frequency that represents a frequency where a frequency trajectory of the first qubit and a frequency trajectory of the second qubit meet, the hold time, and an overshoot frequency equal to the difference between the frequency of the first qubit and the second qubit during the hold time, to minimize a cost function comprising the probability of a leakage error added to the probability of a swap error.

In some implementations adjusting the interaction frequency, hold time and overshoot frequency to minimize the cost function comprises repeatedly, until it is determined that the value of the cost function is converging to a minimum value: scanning an interaction frequency-hold time with the overshoot frequency constant; scanning an interaction frequency-overshoot frequency; and scanning a hold time-overshoot frequency.

In some implementations the method further comprises adjusting the generated schedule using randomized benchmarking to increase iSWAP gate fidelity.

In some implementations allowing the first qubit and the second qubit to freely evolve and interact comprises allowing the first qubit and second qubit to freely evolve and interact within a predetermined distance from 10-01 resonance to enable a population swap.

In some implementations driving detuning between the frequency of the first qubit and the frequency of the second qubit through a second avoided crossing in a swap channel comprises adiabatically driving detuning between the frequency of the first qubit and the frequency of the second qubit through a second avoided crossing in a swap channel.

In some implementations the first qubit and second qubit comprise capacitively coupled Xmon qubits.

In some implementations the leakage channel comprises a manifold spanned by the computational state 11 and two non-computational states 02 and 20, and wherein driving detuning between the frequency of the first qubit and the frequency of the second qubit through a first avoided crossing in a leakage channel comprises driving detuning between the frequency of the first qubit and the frequency of the second qubit through state 11-20 resonance.

In some implementations the swap channel comprises a manifold spanned by the computational states 10 and 01, and wherein driving detuning between the frequency of the first qubit and the frequency of the second qubit through a second avoided crossing in a swap channel comprises driving detuning between the frequency of the first qubit and the frequency of the second qubit through state 10-01 resonance.

In some implementations implementing the second stage in reverse order comprises driving detuning between the frequency of the first qubit and the frequency of the second qubit to achieve a complete population swap between the qubit states 10 and 01.

The subject matter described in this specification can be implemented in particular ways so as to realize one or more of the following advantages.

Existing implementations of iSWAP gates are relatively slow and susceptible to leakage. In particular, it is not a priori clear how to mitigate this leakage without compromising the fidelity of the SWAP operation performed by the iSWAP gate. For example, Rigetti Computing Inc. recently reported gate times of 150 ns and 94% gate fidelity for a parametrically modulated iSWAP gate realized in a system comprised of a fixed frequency transmon qubit coupled to another transmon qubit with tunable frequency (see, for example, N. Didier, E. A. Sete, M. P. da Silva, C. T. Rigetti, arXiv preprint arXiv:1706.06566 (2017).

The presently described techniques use a system comprised of two Xmon qubits with tunable frequencies. This particular arrangement allows for synchronization of SWAP and leakage errors by assigning different trajectories to the two qubits based on their frequency parking positions (asymmetric synchronization) with subsequent tuning of the interaction frequency to a specific value at which both errors are strongly suppressed.

As a result, the presently described techniques for executing iSWAP gates provide fast and robust plunge schedules in the non-adiabatic regime that allow for a complete SWAP operation accompanied by a suppression of the leakage error and fidelity exceeding 99%. Gate execution time is substantially reduced to ~23÷25 ns and approaches the physical limit, $t_{min}=\pi/2g$, for a given inter-qubit interaction strength, e.g. $t_{min} \approx 16$ ns for a typical interaction strength $g/2\pi \approx 15$ MHz available in the current hardware implementation of the Xmon qubits. In addition, the techniques described in this specification provide an efficient protocol for automatic gate calibration.

The presently described techniques for executing iSWAP gates utilize only low-frequency control of detuning between qubit frequencies and are applicable to near term quantum computing architectures. Furthermore, since iSWAP gates are computationally hard to simulate using classical computers, the techniques described in this specification can facilitate state of the art experiments on quantum supremacy and an immediate impact on the field of quantum computing.

Implementation of the presently described techniques can reduce circuit design complexity and provide a path to scalable quantum computing architectures with high-fidelity multi-qubit gates. This, in turn, is an important step forward in achieving the long-term goal of developing an error-corrected quantum computer.

Details of one or more implementations of the subject matter of this specification are set forth in the accompanying drawings and the description below. Other features, aspects, and advantages of the subject matter will become apparent from the description, the drawings, and the claims.

DETAILED DESCRIPTION

Overview

Figure 1:
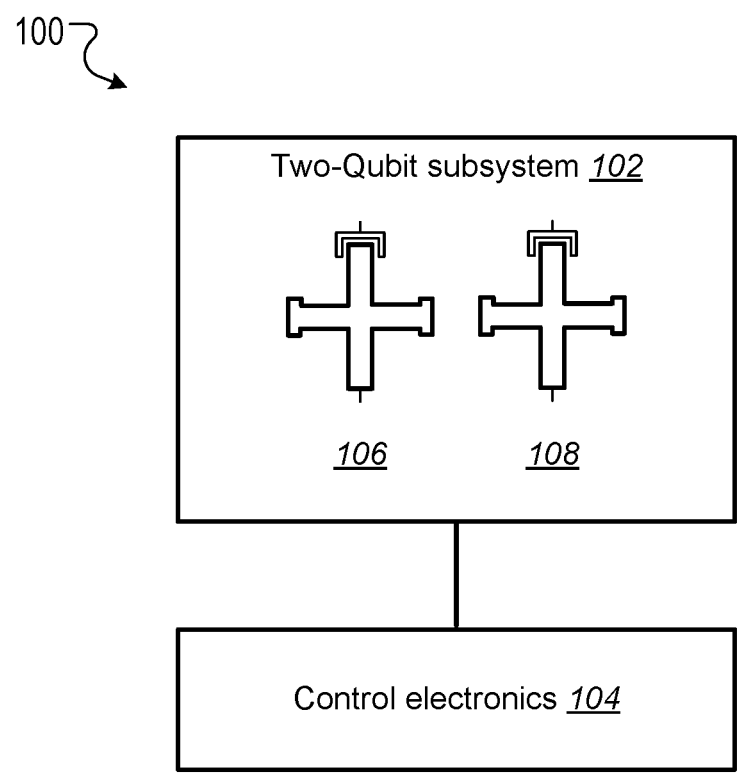
FIG. 1 depicts an example system for implementing iSWAP quantum logic gates.

A complete SWAP operation is a trace preserving, i.e., zero-leakage, transformation of a two-qubit system that enables complete population transfer between the states $|1\rangle \otimes |0\rangle$ and $|0\rangle \otimes |1\rangle$ (herein written as states 10 and 01) of the SWAP channel. Most generally, such an operation can be described by the unitary matrix $$U = \begin{pmatrix} 1 & 0 & 0 & 0 \\ 0 & 0 & -ie^{i\theta_1} & 0 \\ 0 & -ie^{i\theta_2} & 0 & 0 \\ 0 & 0 & 0 & e^{i(\theta_1+\theta_2)}e^{i\phi} \end{pmatrix} \quad (1)$$

in the ($|00\rangle|01\rangle|10\rangle|11\rangle$) basis, where φ represents a phase shift and angles $\theta_1$ and $\theta_2$ represent additional phases that can be corrected using single qubit z-rotations. Since these additional phases can be disregarded the SWAP and iSWAP gates can be described by the unitary matrices given in equation (2) below.

$$U_{swap} = \begin{pmatrix} 1 & 0 & 0 & 0 \\ 0 & 0 & -1 & 0 \\ 0 & -1 & 0 & 0 \\ 0 & 0 & 0 & e^{i\phi} \end{pmatrix}, U_{iswap} = \begin{pmatrix} 1 & 0 & 0 & 0 \\ 0 & 0 & -i & 0 \\ 0 & -i & 0 & 0 \\ 0 & 0 & 0 & e^{i\phi} \end{pmatrix} \quad (2)$$

A challenging aspect of implementing SWAP or iSWAP gates is that the implementation should be consistent with generic quantum computing architectures, e.g., capacitively coupled qubits. In such architectures, qubit frequencies are parked in a so-called zigzag order, with frequencies of the nearest-neighbor qubits separated by ~1 GHz. After gate operations are applied to the qubits, the qubits are returned to their original parking positions. This makes some protocols, e.g., direct passage driving schedules of the Landau-Zener type, difficult or impossible to apply.

In addition, execution of a SWAP or iSWAP gate between a first qubit and second qubit by driving detuning ε(t) between energy levels of 10 and 01 states to zero (10-01 resonance), inevitably requires passing through a 11-20 leakage resonance first. As a result, a simple, trapezoidal-shape ramp function is not sufficient to reliably avoid leakage into non-computational sector of the Hilbert space. Existing hardware implementations of the SWAP or iSWAP gates also suffer from slow execution.

The techniques described in this specification address these challenges. In particular, this specification describes a non-adiabatic protocol that can be applied to qubits to implement two-qubit gates such as SWAP or iSWAP gates with improved fidelities. The described non-adiabatic protocol utilizes low-frequency control of detuning between qubit frequencies. More specifically, the described techniques employ a multi-parameter set of bias-controlled time protocols that are configured to suppress both errors in the SWAP and Leakage quantum channels at the end of gate execution. The shape and duration of the defined pulse is obtained using synchronization of motion in both channels, which results in a high fidelity SWAP operation exceeding 99%, which is a complete population swap in the |01⟩-|10⟩ channel, accompanied by a reduction of probability to excite individual qubits into higher-frequency anharmonic states.

For convenience, the techniques described in this specification are presented with reference to implementing iSWAP gates. However, the techniques can be equally applied to implementing SWAP gates, as well as other gates that are based on SWAP operations, e.g. a $\sqrt{SWAP}$ gate.

EXAMPLE ARCHITECTURE

FIG. 1 depicts an example system 100 for implementing an iSWAP quantum logic gate on a two-qubit subsystem. The example system 100 is an example of a system implemented as part of a quantum computing device in which the systems, components and techniques described in this specification can be implemented.

The system 100 includes a two-qubit subsystem 102 in communication with control electronics 104. The two-qubit subsystem 102 includes a first qubit 106 and a second qubit 108. In some cases, as shown in FIG. 1, the first qubit 106 and second qubit 108 may be capacitively coupled Xmon qubits. For example, the first qubit 106 and second qubit 108 may be part of a linear chain of Xmon qubits included in a quantum computing device. However, in other cases the qubits may include flux qubits, phase qubits, or qubits with frequency interactions.

The first qubit 106 and second qubit 108 can be operated by adjusting the qubit frequencies, e.g., applying pulses generated by the control electronics 104 to the qubits. In cases where the first qubit 106 and the second qubit 108 are Xmon qubits, the qubit frequencies may be parked at a predetermined distance from one another, and in a zig-zag position with respect to other qubits that may be included in the quantum computing device.

A Hamiltonian describing the two qubits may be given by Equation (3) below.

$$H = \sum_{i=1}^{2} \left[ \omega_i(t) - \frac{1}{2}\eta_i(t)(a_i^\dagger a_i - 1) \right] a_i^\dagger a_i - g(t)(a_1 - a_1^\dagger)(a_2 - a_2^\dagger) \quad (3)$$

In Equation (3), $\omega_i(t)$ represents time-dependent natural frequencies of the individual qubits, $\eta_i(t)$ represents the qubit's anharmonic detunings, g (t) represents the interqubit interaction strength, $a_i^\nabla$, $a_i$ represent creation and annihilation operators, and $a_i^\nabla a_i$ represents the number operator. Typical values of η, g include η≈2π×200÷250 MHz and g≈2π×15÷20 MHz. Without loss of generality $\omega_1(t)=\omega_2(t)+\epsilon(t)$, where ε(t) represents the controlled detuning with the initial and final values $\epsilon(-t_p/2)=\epsilon(t_p/2)=2\pi\times1$ GHz, and $t_p$ represents the duration of a pulse applied to the qubit or qubits to implement a quantum logic gate (the gate time).

The Hamiltonian described in Equation (3) can be simplified by transforming it to a rotating frame of the second qubit and eliminating the counter-rotating terms such as g (t)$a_i a_i$ and g (t)$a_i^\nabla a_i^\nabla$. The resulting Hamiltonian in the rotating wave approximation (RWA) conserves the total number of excitations M and, therefore, the 9×9 Hilbert space splits into 5 subspaces corresponding to M=0, 1 . . . , 4. Three of these subspaces with M=0, 1, 2 are relevant for the qubit operations driven by ε(t). These are the ground state 00 (also denoted as |00⟩), the SWAP manifold spanned by the computational states 10 and 01 and the leakage manifold spanned by the computational state 11 and two non-computational states 02 and 20.

The sub-Hamiltonian matrices $H_s(t)$ and $H_l(t)$ describing the SWAP channel and the leakage channel in the RWA can therefore be expressed as $$H_s(t) = \begin{pmatrix} \epsilon(t) & g(t) \\ g(t) & 0 \end{pmatrix} \quad (4)$$

$$H_l(t) = \begin{pmatrix} \epsilon(t) & \sqrt{2}g(t) & \sqrt{2}g(t) \\ \sqrt{2}g(t) & 2\epsilon(t) - \eta_1(t) & 0 \\ \sqrt{2}g(t) & 0 & -\eta_2(t) \end{pmatrix} \quad (5)$$

A schedule for implementing an iSWAP gate is achieved through parametrization of the detuning ε(t). The detuning may take the form $$\epsilon(t) = \nu + 2g_0 \cdot \lambda \cot[\theta(t, \{c\})] \quad (6)$$

where $g_0$ represents an initial value of g(t), the control angle ϑ depends on a set of variational parameters {c} containing M≥2 elements and the two additional parameters ν (shift)

and λ (scaling) may be used in an extended adjustment/ optimization procedure, e.g., the error synchronization procedure described below.

Figure 2:
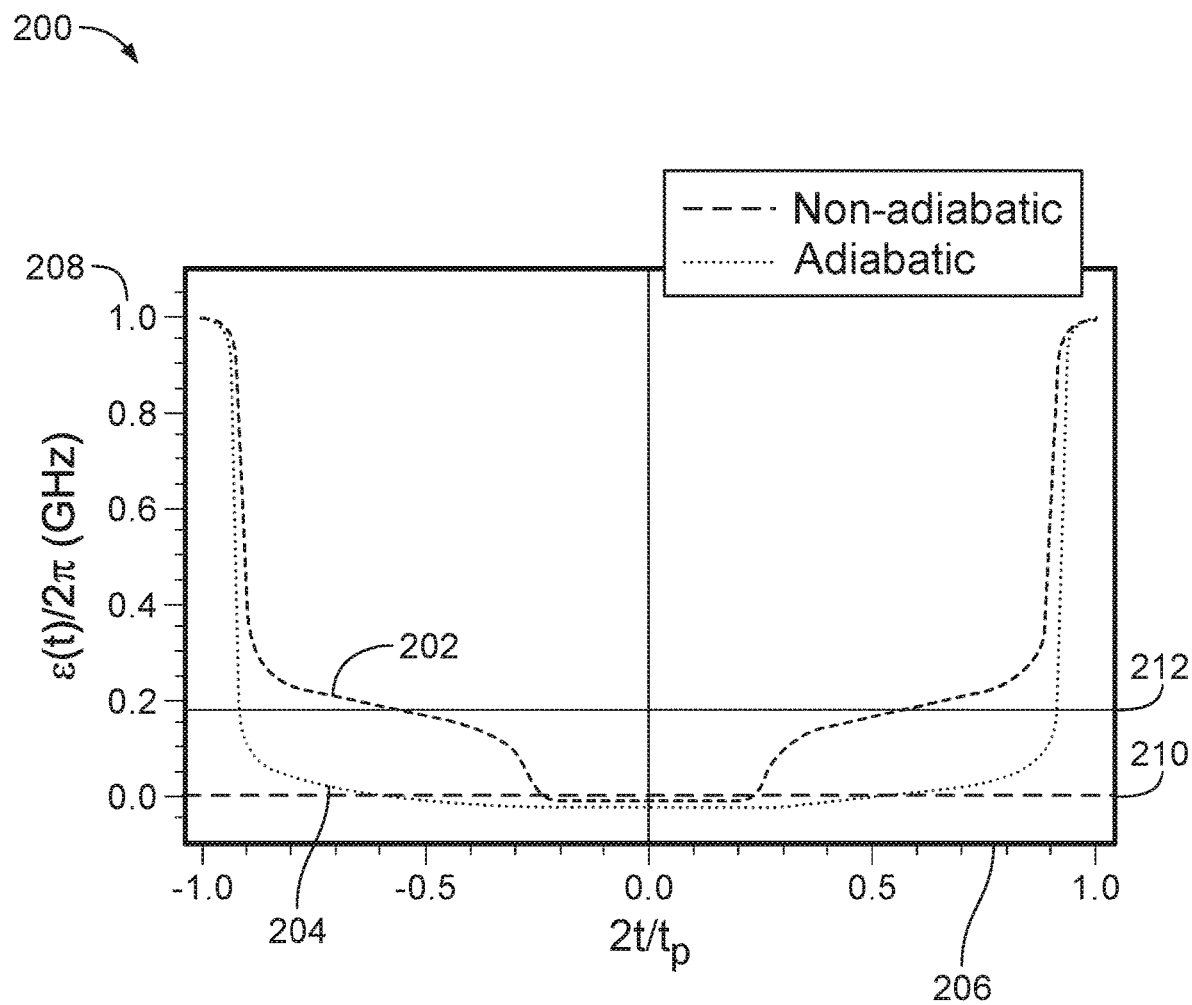
FIG. 2 shows a plot comparing an example adiabatic protocol for performing an iSWAP gate and an example non-adiabatic protocol for performing an iSWAP gate.
Figure 3A:
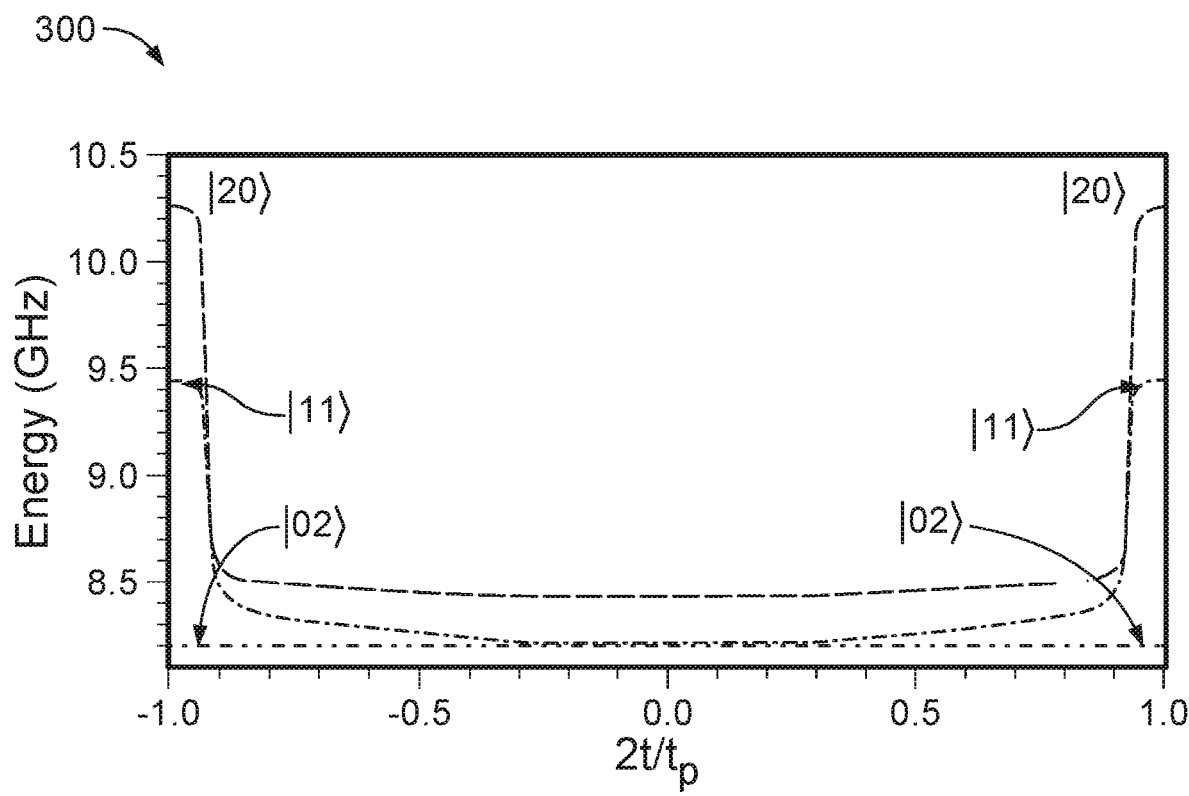
FIG. 3 shows two plots of the energy levels of two coupled Xmon qubits subject to a non-adiabatic protocol.
Figure 3B:
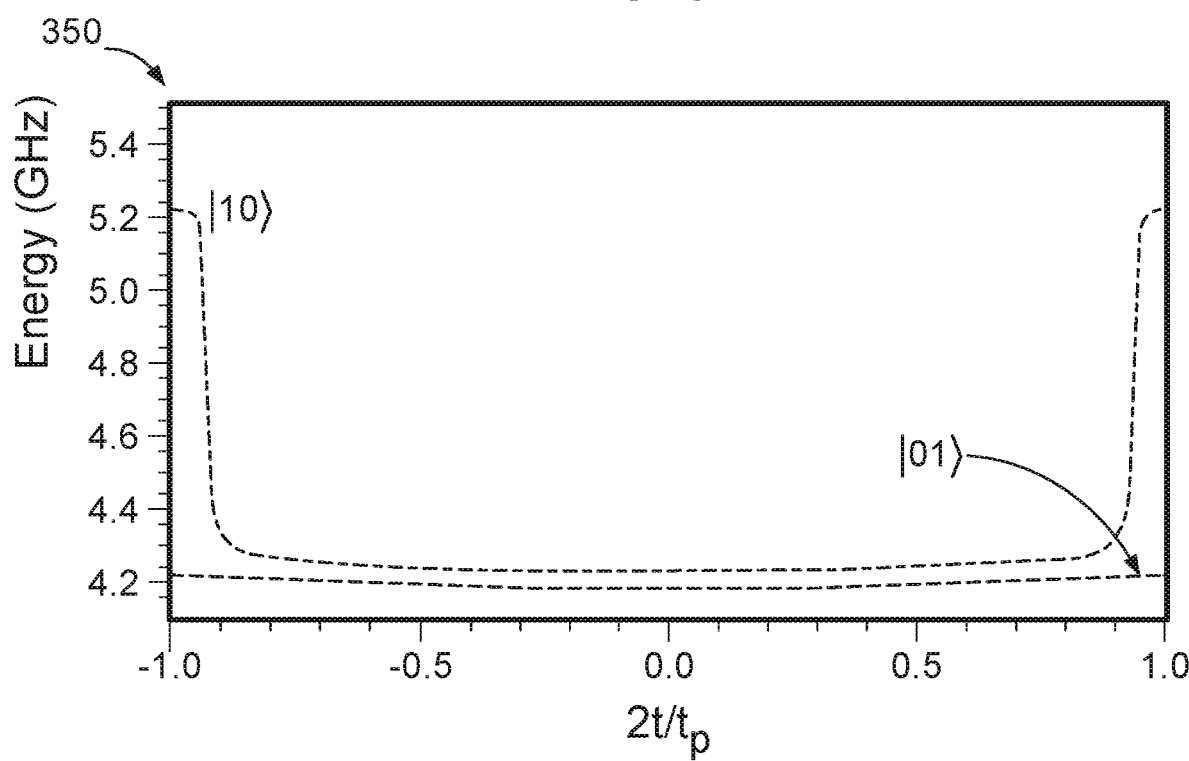

The parameters ν and λ define two limiting cases known in the art as non-adiabatic (ν=0, λ=1) and adiabatic (ν=$\eta_1$, λ=$\sqrt{2}$) protocols, respectively. The differences between these two protocols are illustrated in FIGS. 2 and 3.

The control electronics 104 include control devices, e.g., arbitrary waveform generators, that can operate the first qubit 106 and second qubit 108. For example, the control electronics 104 may include control devices that tune the frequency of the first qubit 106 and second qubit 108 by applying control signals, e.g., voltage pulses, to the qubits through respective control lines.

In addition, the control devices may include measurement devices, e.g., readout resonators, that can perform measurements of the first qubit 106 and the second qubit 108 through respective qubit control lines. The control electronics 104 may be configured to store, display, and/or further process the results of measurements of the first qubit 106 and the second qubit 108.

In some implementations, the control electronics 104 may include a data processing apparatus and associated memory. The memory may include a computer program having instructions that, when executed by the data processing apparatus, cause the data processing apparatus to perform one or more functions described herein, such as applying a control signal to a qubit.

FIG. 2 shows a plot 200 comparing an example adiabatic protocol 202 for performing an iSWAP gate and an example non-adiabatic protocol 204 for performing an iSWAP gate. The plot includes a horizontal axis 206 representing dimensionless time $2t/t_p$ (where $t_p$ represents gate time) and a vertical axis 208 representing the detuning $\epsilon(t)/2\pi$ measured in GHz. A first horizontal line 210 defines points of the level crossings in the SWAP channel. A second horizontal line 212 defines points of the level crossings in the leakage channel.

The distinction between the adiabatic protocol 202 and non-adiabatic protocol 204 is clear when the slopes of ε(t) in the leakage channel 212 near 11-20 resonance (avoided level crossing), which occurs at ε=$\eta_1$, are compared. The non-adiabatic protocol 204 passes through the crossing 212 with very large velocity while the adiabatic protocol 202 has an inflection point corresponding to the minimal relative velocity of the energy levels. For the SWAP channel 210 the 10-01 resonance occurs at ε=0 and the behavior is the opposite, i.e. the non-adiabatic protocol 204 has an inflection point while the adiabatic protocol 202 drops almost vertically.

As shown in FIG. 2, the adiabatic protocol 202 takes the shape of a "cascade waterfall" that drops quickly and slows down near the horizontal line 212, i.e. it forms a "ledge" and then drops quickly and forms a ledge again. This behavior reflects the idea of a local adiabatic evolution for a system with several level crossings. In other words, the schedule behaves as a cascade, it slows down near each avoided crossing and accelerates again after passing it. The non-adiabatic protocol 204 (the subject of this specification) goes straight down as a "plunge waterfall".

The energy eigenvalues of the Hamiltonian given by Equation (1) in the leakage channel and SWAP channel are shown in FIG. 3 and for a non-adiabatic protocol.

FIG. 3 shows two plots 300, 350 of the energy levels of two coupled Xmon qubits, e.g., qubits 106 and 108, subject to a non-adiabatic protocol. The first plot 300 shows energy levels in the leakage manifold. The second plot 350 shows energy levels in the SWAP manifold. Both plots include a horizontal axis representing dimensionless time $2t/t_p$ (where $t_p$ represents gate time) and a vertical axis representing the energy levels measured in GHz.

Proposed Non-Adiabatic iSWAP Gate Schedule

The proposed protocol for implementing an iSWAP gate between a first qubit and a second qubit includes a plunge schedule that defines a trajectory of a detuning between a frequency of the first qubit and a frequency of the second qubit. The plunge schedule includes multiple stages: a two stage ramp-down passage, a plateau stage, and a two-stage ramp-up passage in reverse order that preserves an overall time reversal symmetry of the protocol. Each stage is described in detail below with reference to FIG. 4.

Figure 4:
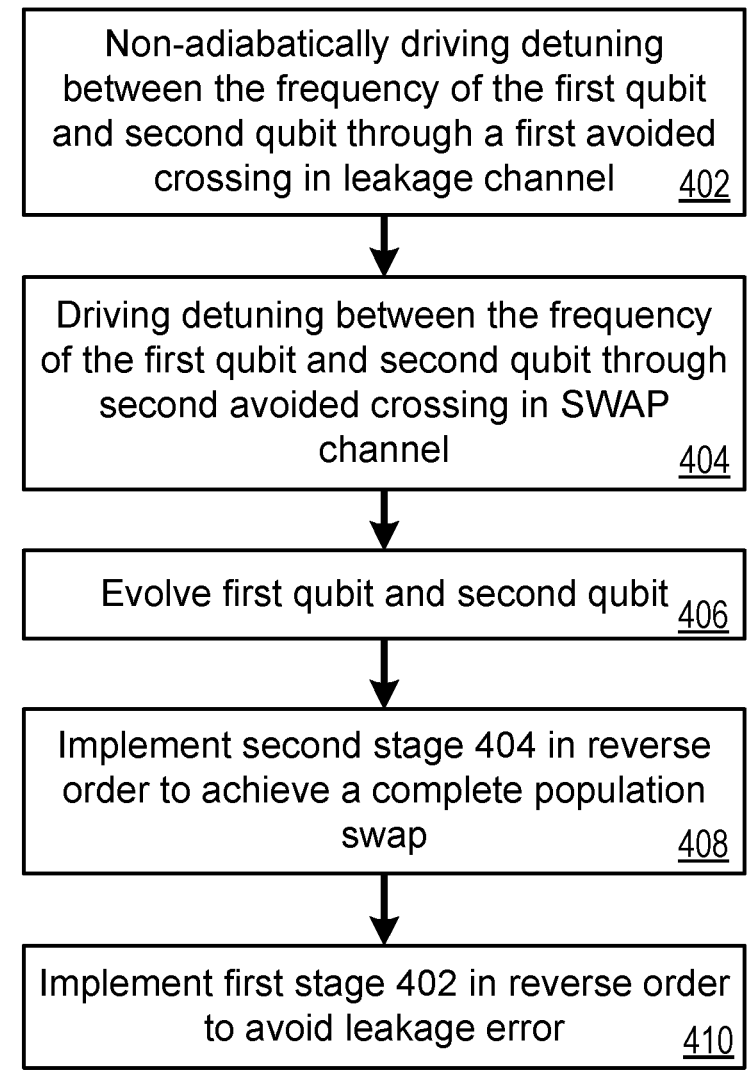
FIG. 4 is a flow diagram of an example process for implementing an iSWAP quantum logic gate between a first qubit and a second qubit according to a plunge schedule.

FIG. 4 is a flow diagram of an example process 400 for implementing the proposed plunge schedule that defines a trajectory of a detuning between a frequency of a first qubit and a frequency of a second qubit. For convenience, the process 400 will be described as being performed by quantum hardware in communication with control electronics located in one or more locations. For example, the system 100 of FIG. 1, appropriately programmed in accordance with this specification, can perform the process 400.

During a first stage, the system non-adiabatically drives the detuning between the frequency of the first qubit and the frequency of the second qubit through the avoided crossing in the leakage channel to avoid leakage error (step 402). That is, the detuning is varied sufficiently quickly such that a curve representing the detuning passes through the crossing with an almost vertical drop. This provides a reduction of the ramp-time overhead and the estimated gate time can approximately equal the physical limit, $t_{min}=\pi/2g$, for a given inter-qubit interaction strength g, e.g. $t_{min}=16$ ns for the interaction strength $g/2\pi=15$ MHz.

Here a definition of the non-adiabatic passage based on the Landau-Zener criterion is adopted. In particular, for the $|11\rangle$-$|20\rangle$ avoided crossing, according to the classical Landau-Zener theory, the probability of the diabatic transition, i.e. that the system will remain in the state $|11\rangle$ after passing the crossing point, is given by $P_D=1-P_{LZ}=\exp(-\Gamma)$, where $\Gamma=2\pi J^2/\nu$, J represents the matrix element of the Hamiltonian between the diabatic states and ν represents the relative "velocity" of the diabatic levels at the crossing point. As such, the passage is considered to be non-adiabatic if $P_D\cong 1$, i.e. $\Gamma\ll 1$. A non-adiabatic threshold, $\Gamma_{th}$, is determined by convergence of the "instant" time-dependent perturbation series with typical values of $\Gamma_{th}\sim 0.1\div 0.2$. In the case of the plunge protocol $J=\sqrt{2}g$ and $\nu=d\epsilon/dt\cong\epsilon_0/t_r$, where $\epsilon_0\cong 1$ GHz is the maximal (a.k.a. idle) detuning and $t_r\cong 3$ ns is a typical rise (a.k.a ramp) time. Therefore, $\Gamma\cong 8.5\times 10^{-3}$, PD$\cong 0.99$ and the non-adiabatic criterion is well satisfied.

During a second stage, the system drives the detuning between the frequency of the first qubit and the frequency of the second qubit through the avoided crossing of the SWAP channel to achieve a complete population swap (step 404). In some implementations the driving of the frequency of detuning between the frequency of the first qubit and the frequency of the second qubit during the second stage is adiabatic.

During the third stage (plateau stage) the system allows the first qubit and the second qubit to freely evolve (step 406). More specifically, during the third stage the qubit frequencies are very close to, e.g., within a predetermined distance from, a resonance 10-01 to enable a population swap. The first qubit and the second qubit are allowed to interact and swap populations while the whole two-qubit system freely evolves during the hold time $$t_h \simeq t_{min} = \frac{\pi}{2g}.$$

Figure 5:
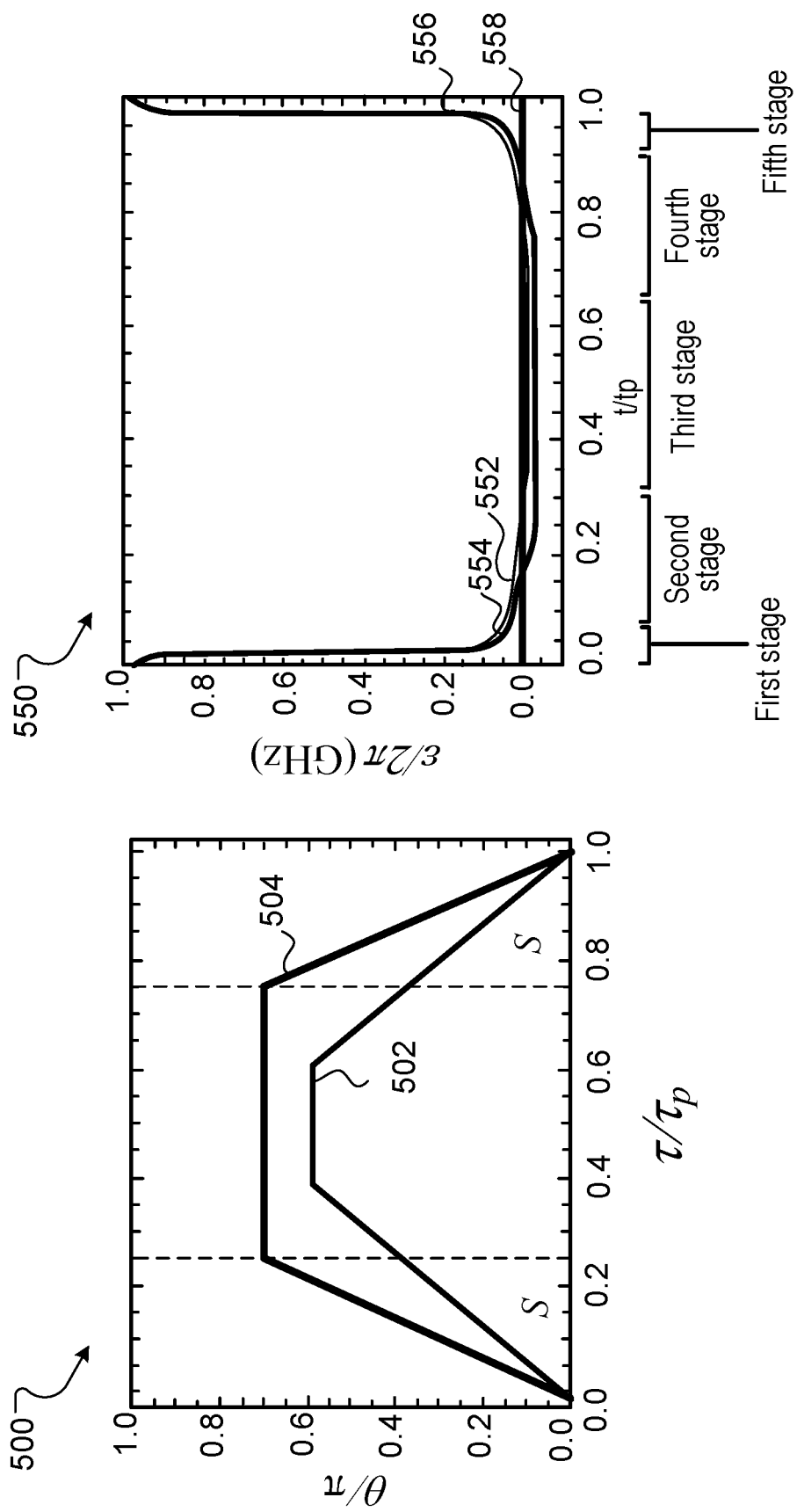
FIG. 5 shows two example plunge schedules.

During the fourth stage, the system implements the second stage described above in reverse order to achieve a complete population swap in the swap channel (step 408). During the fifth stage, the system implements the first stage described above in reverse order to avoid leakage error (step 410). The fourth and fifth stages preserve time reversal symmetry. Example plunge schedules implemented using steps 402-410 of example process 400 are illustrated in FIGS. 2, 3 and 5.

As described below with reference to FIG. 5, in some implementations the proposed plunge schedules implemented using example process 400 are generated based on a trapezoidal waveform for the control angle $\theta(t)$ defining a trajectory of a frequency of the first qubit during execution of the protocol. The motion of the control vector corresponding to the control angle during the proposed protocol accelerates in the middle of the ramp-down process (end of the first stage) and then decelerates (end of the second stage). The acceleration near the avoided crossing of the leakage channel is governed by a non-adiabatic Rabi schedule, as described below, which results in Rabi oscillations of the leakage error versus $t_p$ with amplitude proportional to $$\frac{g^2}{\eta^2}.$$

In other implementations, as described below with reference to FIGS. 8-17, the proposed plunge schedules may be generated by defining a trajectory of a frequency of the first qubit and a trajectory of a frequency of the second qubit during execution of the protocol.

Implementing iSWAP Gates Using Rabi Protocols

Alternative methods for implementing an iSWAP gate include protocols that satisfy the condition of local adiabatic evolution. The condition of local adiabatic evolution means that detuning may change quickly far away from avoided crossings and must slowdown in proximity to the minimum gap between energy levels. As such, the condition of the local adiabatic evolution can be broadly defined.

One known local adiabatic condition can be given by Equation (7) below.

$$\langle \Psi_0(t)|\partial_t\Psi_1(t)\rangle = const \cdot \omega_g^2(t) \tag{7}$$

In Equation (7), $\Psi_0$ and $\Psi_1$ represent instantaneous adiabatic eigenstates of the Hamiltonian describing the swap channel $H_s(t)$, and $\omega_g(t)=\sqrt{\epsilon(t)^2+4g^2}$ represents a time dependent gap for $H_s(t)$, with $\epsilon$ representing the detuning between energy levels and g representing interqubit interaction strength. (To introduce the protocol it is convenient to initially assume that $g(t)=g_0$, however this assumption will be subsequently relaxed).

Schedules for implementing an iSWAP gate that satisfy the local adiabatic condition given by Equation (5) include forward single-passage schedules. In a forward single-passage schedule, detuning sweeps a large energy from $\epsilon_i>0$ to $\epsilon_f<0$ and the two qubit system passes the avoided crossing only once. Since the qubits do not return to their original parked states this schedule cannot be directly used in Xmon architecture. However, analysis of this protocol provides insights that are used to design the proposed non-adiabatic plunge protocol.

The Hamiltonian describing the swap channel $H_s(t)$ in Equation (4) can also be expressed as $$H_s(t) = -\frac{\omega_g(t)}{2}\begin{pmatrix} \cos\theta(t) & \sin\theta(t) \\ \sin\theta(t) & -\cos\theta(t) \end{pmatrix} \tag{8}$$

where the control angle $$\theta(t) = arccot\left[\frac{\epsilon(t)}{2g}\right] \tag{9}$$

represents the angle between the control vector (effective magnetic field $b=(2g, \epsilon(t))$) and the z-axis on a Bloch sphere for one of the two qubits. The control angle defines the motion of the qubit whose frequency is varied during implementation of the iSWAP gate. The local adiabatic condition given by Equation (7) implies that $$\partial_t\theta(t) = const \cdot \omega_g(t) \tag{10}$$

Based on this implication, the problem can be solved exactly using transformation of the time-dependent Schrödinger equation to the natural time scale:

$$\tau(t) = (2g_0)^{-1}\int_{-t_p/2}^{t}\omega_g(s)ds \tag{11}$$

$$t(\tau) = \int_0^\tau \sin[\theta(\tau')]d\tau' \tag{12}$$

These equations define a bijection describing an accelerating frame of reference in which the magnitude of the effective magnetic field (control vector) is a time-independent constant. In other words, in the natural time frame the Hamiltonian of a two-level system has a constant gap $w_{min}=2g$ and the motion of the system is completely determined by the dependence of the control angle on the natural time $\theta(\tau)=\theta[t(\tau)]$.

It follows from the expression for $\tau(t)$ in Equation (12) that $\partial_\tau = 2g\omega_g^{-1}(t)\partial_t$, and from the local adiabatic condition of Equation (7) and Equation (10) it follows that $\partial_\tau\theta(\tau) = const$. That is $$\theta(\tau) = \theta_0 + \frac{\theta_f \tau}{\tau_p} \tag{13}$$

where $\theta_0$ and $\theta_f$ represent initial and final angles, respectively, and $\tau_p$ represents the pulse time (gate time) in the natural time scale. Equation (9) shows that by imposing the local adiabatic condition given in Equation (7) the known Rabi problem about the motion of a magnetic moment in a uniformly rotating magnetic field of fixed magnitude is obtained.

In Equation (8), the control vector is rotating within x, z plane around y axis from the North to the South Pole. To make the resemblance with the Rabi problem more apparent the current coordinate system is rotated by $\pi/2$ around the x-axis. This places the control vector into the x, y-plane (instead of the x, z-plane as in the standard qubit nomenclature). The transformed Schrödinger equation then assumes the form:

$$i\partial_\tau \psi(\tau) = -g_0 \begin{pmatrix} 0 & e^{i\theta(\tau)} \\ e^{-i\theta(\tau)} & 0 \end{pmatrix} \psi(\tau) \tag{14}$$

where $\psi(\tau)=\chi_+(\tau)|\alpha\rangle+\chi_-(\tau)|\beta\rangle$ represents a two-component spinor and $|\alpha\rangle=(1, 0)$ and $|\beta\rangle=(0, 1)$ represent eigenvectors of the z-Pauli operator in the rotated coordinate system (i.e., the z-Pauli operator in the original frame). Equations (13) and (14) describe a particular case of the Rabi problem with zero magnetic field in z-direction.

The functions $\chi_{-,+}(\tau)$ satisfy two separate Schrödinger-like equations:

$$-4\chi''_{-,+}(x)-(\gamma^2 \pm 2i\theta''(x)+\theta'(x)^2)\chi_\pm(x)=0 \qquad (15)$$

with the initial conditions chosen as either one of the eigenstates (labeled 0 or 1) of the Hamiltonian given by Equation (6) at $t=-t_p/2$. The second boundary condition for the derivatives of $\chi_+$ can be obtained directly from Equation (8). Here $x=2\tau/t_p$ represents the dimensionless natural time during the gate operation and $\gamma=g \cdot t_p$ represents the dimensionless total duration of the gate, i.e. gate time.

In what follows the time-independent (or "diabatic") basis 0 and 1 associated with the eigenstates of the Hamiltonian at initial time when the levels are very far from each other are used. The main quantity of interest is the probability $$P_{01}(\tau_p) = P_{01}\left(\frac{t_p}{2}\right)$$

of the transition from the initial state 0 to the final state 1 at the end of the gate, $t=t_p/2$. From the standpoint of the SWAP operation $P_{01}$ is always the probability of success and $P_s=1-P_{01}$ is the probability of a SWAP error. Using Equation (15) and the boundary conditions the probability of the SWAP error $P_s$ that satisfies the Schrödinger-like equations is given by $$P_s=1-P_{01}=\tfrac{1}{2}|\chi_+(\tau_p)-\chi_-(\tau_p)|^2 \qquad (16)$$

Equations (14) and (15) can be solved straightforwardly, reflecting that the Hamiltonian in Equation (8) becomes time-independent in the rotating frame associated with the uniformly rotating control vector. The probability of the SWAP error is given by $$P_s(\gamma) = 1 - P_{01}(\gamma) = \frac{1}{\gamma^2+1}\sin^2\left(\frac{\pi}{2}\sqrt{\gamma^2+1}\right) \qquad (17)$$

where $P_s$ is represented as a function of the dimensionless gate time $\gamma=g \cdot t_p$ for convenience. The resulting detuning schedule for the Rabi protocol can be determined using the relations $\theta(t)=\mathrm{arccot}[\epsilon(t)/2g]$ and $\tau(t)=(2g)^{-1}\int_{-t_p/2}^{t}\omega_g(s)ds$, namely $$\epsilon(t) = -\frac{2g\left(\frac{2t}{t_p}\right)}{\sqrt{1-\left(\frac{2t}{t_p}\right)^2}} \qquad (18)$$

This detuning schedule, which produces the SWAP error given by Equation (17), has several interesting properties. For the presently described schedule, it is important that the error oscillates as a function of the pulse time and has a set of times where $P_s=0$. If the pulse time is tuned to one of these intervals the SWAP gate can be executed with very high fidelity.

Method for Generating the Proposed Plunge Schedule

In what follows the time-independent diabatic basis 0 and 1 associated with the eigenstates of the Hamiltonian at initial time when the levels are very far from each other are used, since it is more convenient for numerical implementation. Also for convenience, return schedules compatible with Xmon architecture are considered and the gate simulations are performed within a time interval $(0,t_p)$. Again, the main quantity of interest in the SWAP channel is the probability of the transition from the initial state 0 to the final state 1 at the end of the gate $P_{01}(t_p)$. In the leakage channel, the main quantity of interest is the probability of a transition from the computational state $|11\rangle$ to the non-computational state $|20\rangle$ and $P_1=P_{01}(t_p)$ represents the leakage error.

The schedule is based on a trapezoidal wave form for the angle $\theta(\tau)$ in the natural time scale. The trapezoidal wave form can be given by $$\theta(\tau) = \begin{cases} \omega_r\tau, & 0 < \tau < \tau_r \\ \theta_{max} & \tau_r < \tau < \tau_r + \tau_h \\ \theta_{max} - \omega_r(\tau - \tau_r - \tau_h) & \tau_r + \tau_h < \tau < \tau_p \end{cases} \qquad (19)$$

where $\omega_r$ represents the angular velocity during ramp up (or ramp down) time intervals of the length $\tau_r$. By defining a relative ramp time $s=\tau_r/\tau_p$ the plunge schedule is defined by two parameters: s with $0<s<\tfrac{1}{2}$ and $\theta_{max}$, which is the maximum angular distance travelled by the control vector. As such, $\omega_r=\theta_{max}/(s\tau_p)$ and the hold time $\tau_h=(1-2s)\tau_p$.

The meaning of the total gate time in the natural scale can be related to the laboratory gate time $t_p$ using Equation (12):

$$\tau_p = \frac{t_p\theta_{max}}{\theta_{max}(1-2s)\sin(\theta_{max}) + 2s(1-2\cos(\theta_{max}))} \qquad (20)$$

Two example trapezoidal waveforms 502, 504 for the angle $\theta/\pi$ in natural time are shown in plot 500 of FIG. 5. Plot 550 of FIG. 5 shows two corresponding detuning schedules $\epsilon(t)/2\pi$ for each trapezoidal waveform 503 and 504. Detuning schedule 552 corresponds to trapezoidal waveform 502 and includes parameter values s=0.39, $\theta_{max}=0.59\pi$. Detuning schedule 554 corresponds to trapezoidal waveform 504 and includes parameter values s=0.25, $\theta_{max}=0.7\pi$. For convenience, plot 550 also shows avoided crossings 556 and 558 representing avoided crossings in the leakage and SWAP channels, respectively.

The part of the unitary evolution matrix corresponding to the SWAP channel is now calculated. Since the schedule defined by Equation (19) is piecewise, Equation (15) is solved in each time interval and solutions at each time "wall" are matched using boundary conditions. Eliminating the state vectors corresponding to the intermediate times propagates the solution from the beginning to the end. As a result, the evolution matrix U describing the SWAP unitary is obtained as a product of transfer matrices M corresponding to each time interval:

$$U(\tau_r,\omega_r,\tau_h)=u \cdot M(\tau_r,-\omega_r,\omega_r\tau_r) \cdot M(\tau_h,0,\omega_r\tau_r) \cdot M(\tau_r,\omega_r,0) \qquad (21)$$
$$u\overset{\forall}{,}$$

where $\tau_p=2\tau_r+\tau_h$ and the expression for a generic transfer matrix depends on three variables: time interval $\tau$, angular velocity $\kappa$ and the initial phase $\theta_0$ of the control vector. The explicit form of the transfer matrix is given by:

$$M(\tau, \kappa, \theta_0) = \begin{pmatrix} e^{\frac{i\kappa\tau}{2}}\left[\cos\left(\frac{1}{2}\Omega\tau\right) - \frac{i\kappa}{\Omega}\sin\left(\frac{1}{2}\Omega\tau\right)\right] & \frac{2ig}{\Omega}e^{i(\theta_0+\frac{\kappa\tau}{2})}\sin\left(\frac{1}{2}\Omega\tau\right) \\ \frac{2ig}{\Omega}e^{-i(\theta_0+\frac{\kappa\tau}{2})}\sin\left(\frac{1}{2}\Omega\tau\right) & e^{-\frac{i\kappa\tau}{2}}\left[\cos\left(\frac{1}{2}\Omega\tau\right) + \frac{i\kappa}{\Omega}\sin\left(\frac{1}{2}\Omega\tau\right)\right] \end{pmatrix}, \quad (22)$$

where $\Omega=\Omega(\kappa)=\sqrt{4g^2+\kappa^2}$. As shown by Equation (21), the variables $\kappa$, $\theta_0$, $\tau$ assume their particular values for each time interval in Equation (22). Finally, the matrix u rotates the coordinate system back to its initial orientation with the control vector rotating within the x-z plane:

$$u = \frac{1}{2}\begin{pmatrix} 1+i & -1+i \\ 1+i & 1-i \end{pmatrix} \quad (23)$$

Using Equations (21)-(23), the final expression for the transition probability $P_{01}$ is obtained:

$$P_{01}(\tau_r, \tau_h) = \quad (24)$$

$$\frac{4\sin^2\left(\frac{1}{2}\Omega_r\tau_r\right)}{\Omega_r^2}\left[\frac{2g}{\Omega_r}\cos(g\tau_h)\sin\left(\frac{1}{2}\Omega_r\tau_r\right) + \sin(g\tau_h)\cos\left(\frac{1}{2}\Omega_r\tau_r\right)\right]^2,$$

where $\Omega_r=\sqrt{4g^2+\omega_r^2}$. Equation (20) can be used to determine an explicit dependence $P_{01}(\gamma)$ and express the transition probability in the same form as for in the forward schedules described above.

Figure 6:
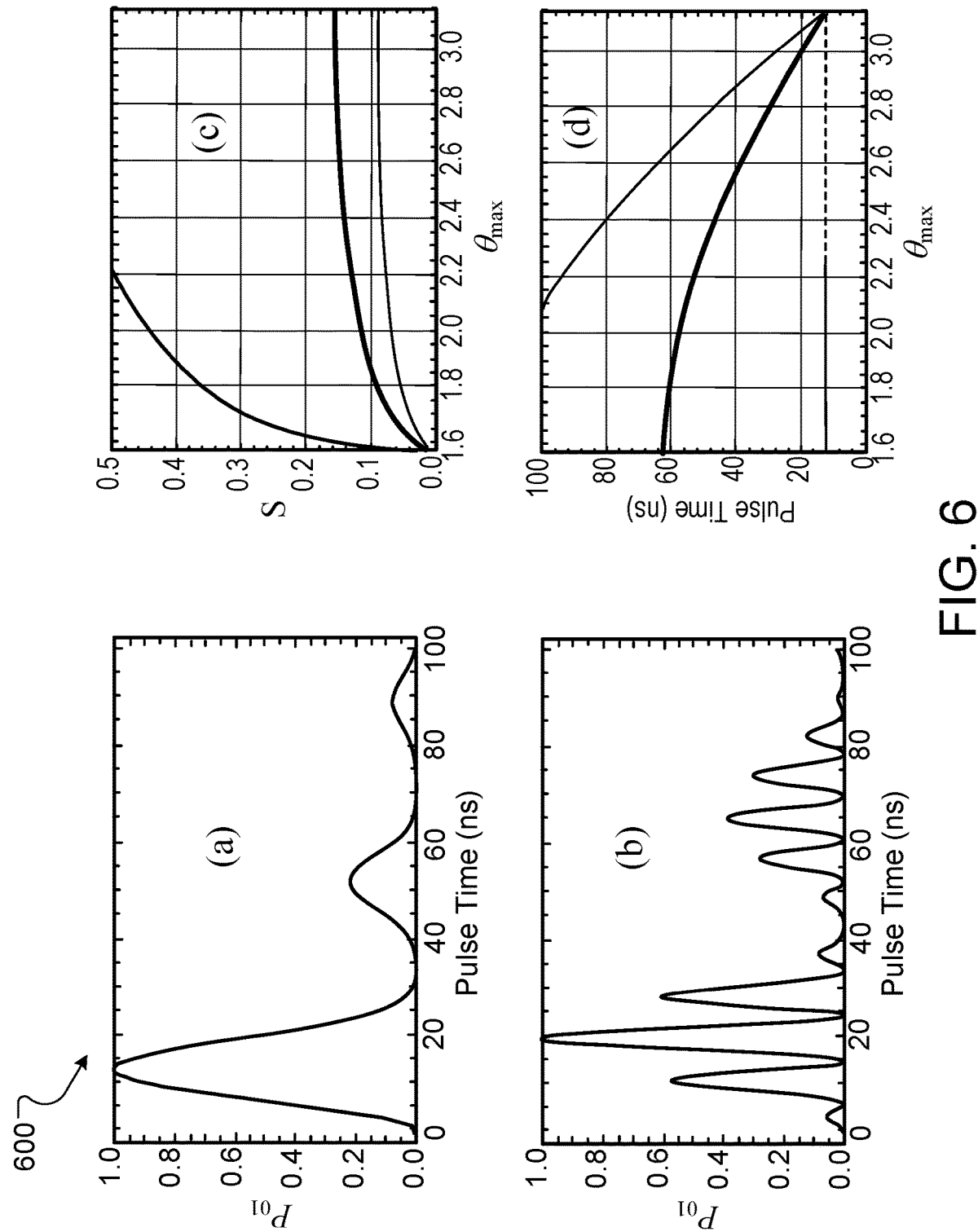
FIG. 6 shows transition probabilities for two example schedule shapes that allow for a complete SWAP operation.

FIG. 6 shows transition probabilities for two example schedules that allow for a complete SWAP operation $P_{01}=1$. FIG. 6 includes four plots (a), (b), (c) and (d). Plots (a) and (b) show the transition probability $P_{01}$ as a function of pulse time in ns for both example schedules. As shown in plot (a), a complete SWAP operation $P_{01}=1$ can be executed for a pulse time corresponding to the first maxima of plot (a), i.e., approximately 12 ns. Similarly, as shown in plot (b), a complete SWAP operation $P_{01}=1$ can be executed for a pulse time corresponding to the third maxima of plot (b), i.e., approximately 20 ns. Plot (c) is a phase diagram that shows the parameter s as a function of $\theta_{max}$. Each line in plot (c) represents a pair (s, $\theta_{max}$) which defines a schedule with a complete population swap. Plot (d) is a phase diagram that shows pulse time in ns as a function of $\theta_{max}$. Each line in plot (c) represents a pair (gate time, $\theta_{max}$) which defines a schedule with a complete population swap.

As described above, $P_{01}(\gamma)$ describes probability of success of the SWAP operation. Therefore, the condition $P_{01}=1$ ensures complete population swap between the qubits. Contrary to the forward schedules discussed above, such a condition is not guaranteed for any particular return schedule. However, fortunately, in the case of the protocol presented in this specification such schedules can be found and a relation between the control parameters s and $\theta_{max}$ for which there is a pulse time $t_p=\gamma_0/2g$ such that $P_{01}(\gamma_0)=1$ can be identified, as shown in FIG. 6.

To determine a pulse time $t_p=\gamma_0/2g$ such that c, a dimensionless parameter $\alpha=2_g/\omega_r$ is introduced, and the probability of success in the SWAP operation can be expressed as:

$$P_{01}(\alpha) = \quad (25)$$

$$\frac{4}{1+\alpha^2}\sin^4\left(\frac{\theta_{max}}{2}\sqrt{1+\alpha^2}\right)\left[\frac{\alpha\cos\xi(\alpha)}{\sqrt{1+\alpha^2}} + \cot\left(\frac{\theta_{max}}{2}\sqrt{1+\alpha^2}\right)\sin\xi(\alpha)\right]^2$$

where $\xi(\alpha)=g\tau_h=\alpha\theta_{max}(1/(2s-1))$ and the relation between $\alpha$ and $\gamma$ is given by:

$$\gamma = \frac{\alpha}{2s}[\theta_{max}(1-2s)\sin\theta_{max} + 2s(1-\cos\theta_{max})] \quad (26)$$

The line of the complete swap, i.e., the relation between s and $\theta_{max}$ for which the curve $P(\gamma)$ reaches the point $P(\gamma_0)=1$ can be determined analytically by determining the maximum of the function $P_{01}(\alpha)$ in Equation (25). This relation can be expressed in parametric form as:

$$\theta_{max}(\alpha) = \frac{\arccos(-\alpha^2)}{\sqrt{\alpha^2+1}} \quad (27)$$

$$s(\alpha) = \frac{\alpha\theta_{max}(\alpha)}{2[\alpha\theta_{max}(\alpha) + \arccos(\alpha)]} \quad (28)$$

where $0\leq\alpha\leq1$ and Equations (27) and (28) describe the upper curve in FIG. 6 plot (c). FIG. 6 also shows that $s(\theta_{max})$ is a multi-valued function with multiple branches stemming from the arccos terms in Equations (27) and (28). The other curves describe the schedules with multiple Rabi oscillations during the hold time (i.e. the longer gates).

Each point on the upper curve in FIG. 6 (c) corresponds to a different shape of the trapezoid $\theta(\tau)$ starting from $\alpha=0$, s=0, $\theta_{max}=\pi/2$ (rectangle) and ending at $\alpha=1$, s=0.5, $\theta_{max}=\pi/\sqrt{2}$ (triangle). In spite of the variety shapes the pulse time along the line of the complete SWAP (the lowest line FIG. 6 (d)) is almost completely independent on $\theta_{max}$. More specifically, the pulse time is bound within the interval $$\frac{\pi}{2g} \leq t_p \leq \frac{1}{2g}\left(\cos\frac{\pi}{\sqrt{2}}\right) \cong 1.022\frac{\pi}{2g} \quad (29)$$

Therefore the slowest gate in this family is only 2.2% longer than the physical limit $t_{min}=\pi/2g$.

Synchronization of Errors

A first step of the error synchronization procedure is to determine a schedule which corresponds to a complete SWAP operation in a targeted region of the gate times. This determination can be performed either analytically or numerically by solving the Schrödinger for the SWAP and leakage channels. The next step is fine-tuning and solving for both channel simultaneously to synchronize the minimal errors and find the set of parameters corresponding to the maximum gate fidelity.

The Schrödinger equations can be expressed as:

$$i\partial_t \Psi_s(t) = H_s(t) \Psi_s(t) \quad (30)$$

$$i\partial_t \Psi_l(t) = H_l(t) \Psi_l(t), \quad (31)$$

where $H_s(t)$, $H_l(t)$ represent the 2×2 and 3×3 matrices given by Equations (2) and (3) respectively. Equations (30) and (31) can be solved with the boundary conditions:

$$\Psi_s\left(-\frac{t_p}{2}\right) = \chi_{10}^s \quad (32)$$

$$\Psi_l\left(-\frac{t_p}{2}\right) = \chi_{11}^l \quad (33)$$

where $\chi_{10}^s$ and $\chi_{11}^l$ represent the eigenvalues of the time-independent Hamiltonians $H_s$ and $H_l$ corresponding to the computational states 10 and 11 when the detuning between the qubit frequencies is maximal, i.e. to the idle qubits residing in their parking positions. Here it is assumed that the gate starts at $$-\frac{t_p}{2}$$

and ends at $t_p=2$. Therefore, the leakage errors can be expressed as:

$$P_s = |\langle \Psi_s(t_p/2) | \chi_{10}^s \rangle|^2 \quad (34)$$

$$P_l = 1 - |\langle \Psi_l(t_p/2) | \chi_{11}^l \rangle|^2 \quad (35)$$

Figure 7:
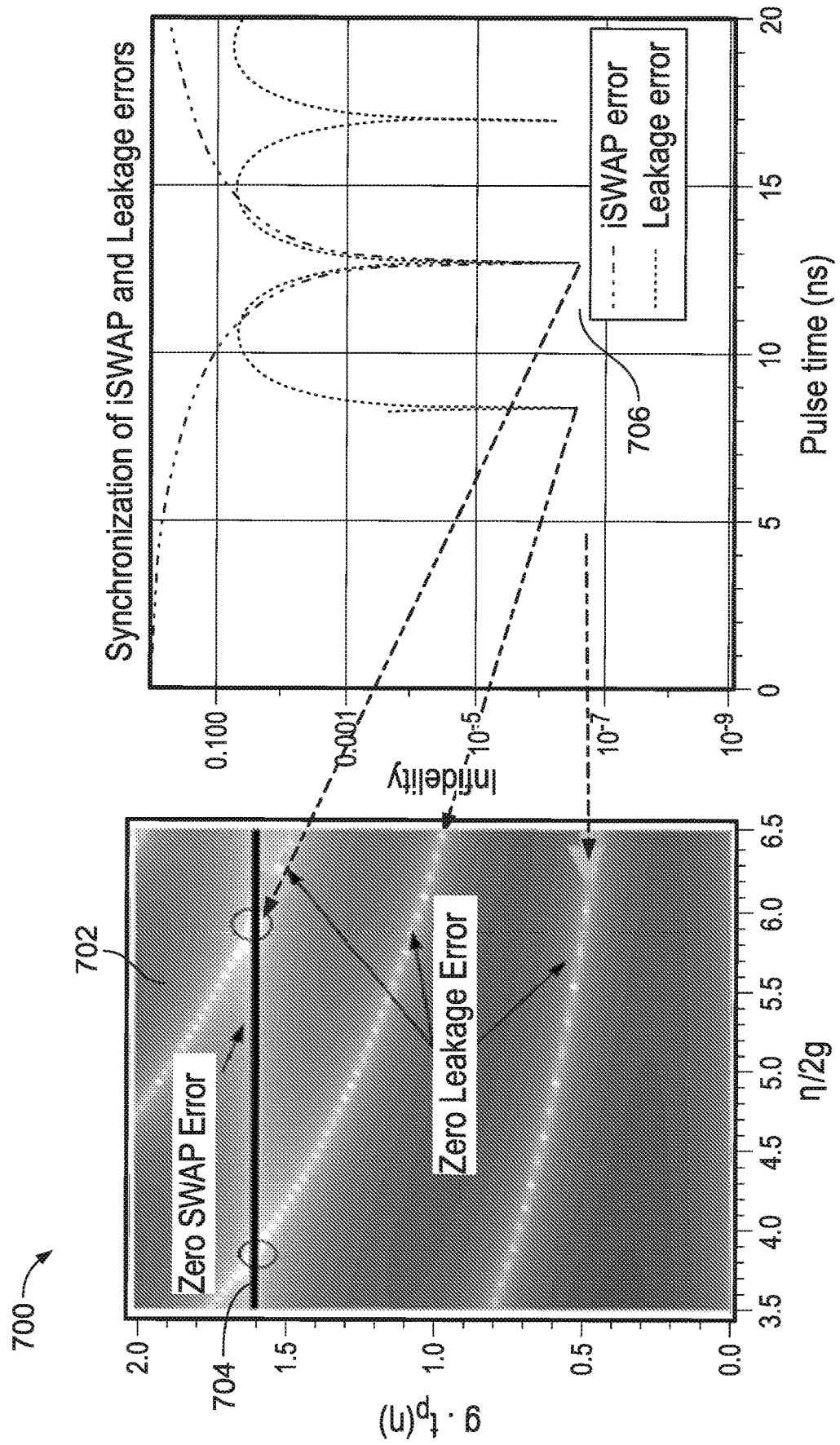
FIG. 7 shows an example synchronization of leakage and SWAP errors.

After $P_s$ and $P_l$ are determined over a range of $t_p$ and other parameters, the errors can be synchronized. Synchronization of the errors uses the fact that the leakage error is an oscillating function of $t_p$, which has a set of points such that $P_l(t_p)=0$. FIG. 7 illustrates this point by using η as a fitting parameter. However, in practice, since η cannot be controlled during the gate execution, error synchronization must be performed the other way around. This is challenging task, as will be demonstrated in the following sections. However, the techniques described in this specification provide an efficient solution, which helps to realize a fast and robust automatic protocol for qubits' calibration.

FIG. 7 shows an example synchronization of leakage and SWAP errors. The dotted lines 702 represent gate times corresponding to zero leakage. The horizontal line 704 represents the gate time $t_p$ such that $P_s(t_p)=0$. As shown in FIG. 7, the gate time can be chosen to satisfy $P_s(t_p)\cong P_l(t_p)\cong 0$ at the third zero of leakage error 706.

Asymmetric Synchronization of Errors

As described above, FIGS. 2, 3 and 5 show example qubit trajectories $\omega_i(t)$ and the energy levels of a two-qubit system in the rest frame of reference of the idle second qubit. That is, the trajectory of the detuning between the frequency of the first qubit and the frequency of the second qubit is defined by adjusting the frequency of the first qubit whilst maintaining the frequency of the second qubit frequency at a constant value. However, in some implementations in may be more practical to adjust both qubit frequencies and allow both qubit frequencies to move symmetrically. In these implementations the typical trajectories of the qubits are realized as two symmetrically shaped and rounded trapezoid-like pulses, as shown in FIG. 8.

Figure 8:
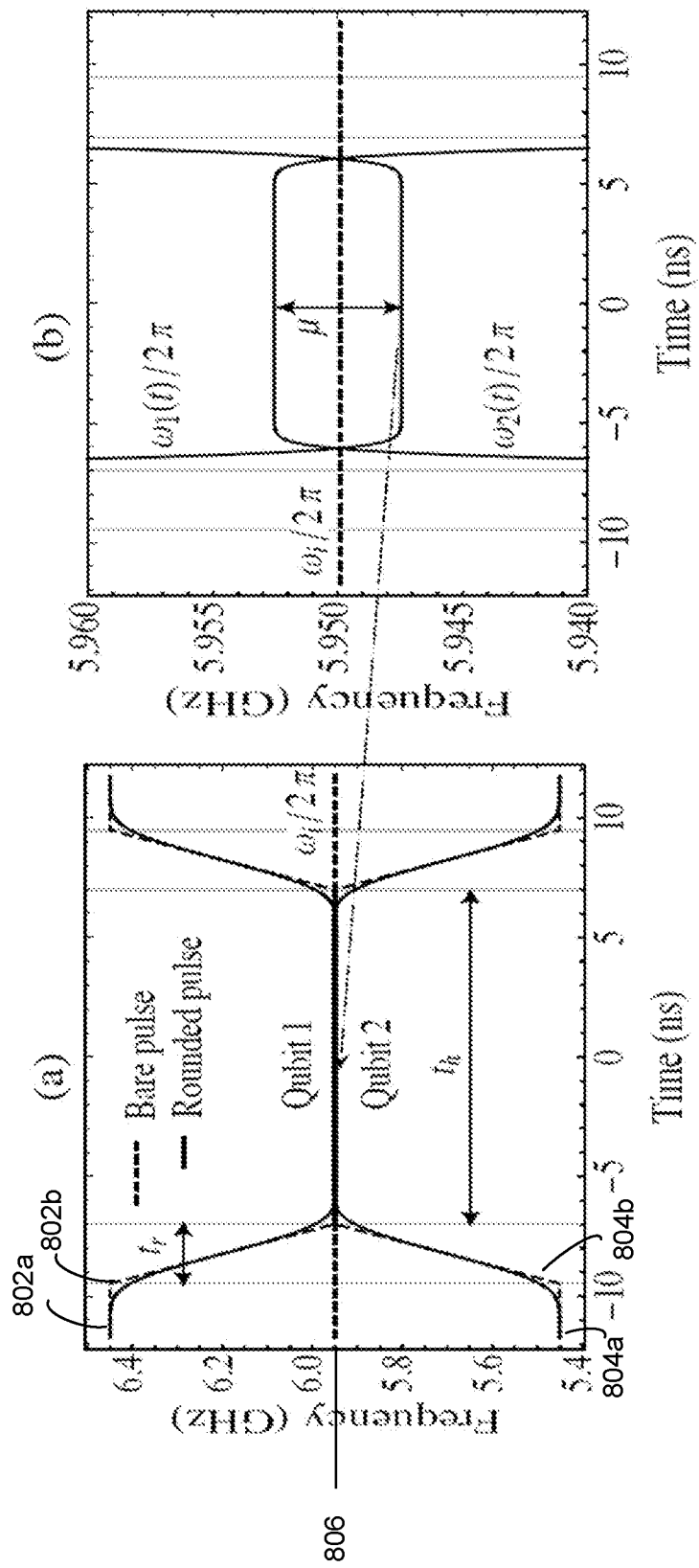
FIG. 8 shows an example detuning trajectory during implementation of an iSWAP gate.

Plot (a) of FIG. 8 shows an example detuning trajectory during implementation of an iSWAP gate at a normal scale covering the whole range of detuning ~1 GHz. The x-axis of plot (a) represents time (ns) and the y-axis represents qubit frequency (GHz). Line 802a represents the frequency of the first qubit, achieved using a rounded pulse. Line 802b represents the frequency of the first qubit, achieved using a bare pulse. Line 804a represents the frequency of the second qubit, achieved using a rounded pulse. Line 804b represents the frequency of the second qubit, achieved using a bare pulse.

The trajectories of the first qubit and second qubit meet at the mid-point cut, which is called the interaction frequency. This mid-point is represented by line 806. At the mid-point, the qubit frequencies are very close to a resonance and the two-qubit system freely evolves while the qubits strongly interact with each other. The time interval $t_h$ of this interaction is called the hold time. As long as the coupling constant g is-time independent all the choices of the trajectories that preserve the detuning $\epsilon(t)=\omega_1(t)-\omega_2(t)$ are equivalent up to a global phase and have the same probability outcome.

Plot (b) of FIG. 8 shows the example detuning trajectory of plot (α) magnified in the vicinity of the interaction frequency.

The consequences of the assumption g=const can be demonstrated using an example of an instant plunge protocol. Consider an instant plunge of the first qubit to the $|10\rangle-|01\rangle$ resonance and assume that the second qubit is at rest and g is time-independent. The probability of the population swap is given by the formula for Rabi oscillations:

$$P_{10 \to 01} = \sin^2(g t_p) \quad (36)$$

Since at the resonance $\epsilon(t)=0$, it can be seen from Equation (5) that the diabatic energy levels of the states $|20\rangle$ and $|02\rangle$ become degenerate, which allows the so-called "bright" and "dark" states to be introduced:

$$|\psi_b\rangle = \frac{1}{\sqrt{2}}(|02\rangle + |20\rangle)$$

$$|\psi_d\rangle = \frac{1}{\sqrt{2}}(|02\rangle - |20\rangle)$$

In the basis of the states $|11\rangle$, $|\psi b\rangle$ and $|\psi d\rangle$ the Hamiltonian of Equation (5) assumes the form:

$$H_l(t) = \begin{pmatrix} 0 & 2g & 0 \\ 2g & -\eta & 0 \\ 0 & 0 & -\eta \end{pmatrix} \quad (37)$$

Thus, the states $|11\rangle$ and $|\psi b\rangle$ form a two-level system with detuning η and coupling 2g while the dark state $|\psi d\rangle$ is completely decoupled from the other states. Since initially the state $|\psi d\rangle$ is not populated the leakage to the non-computational subspace is caused only by the Rabi oscillations between the states $|11\rangle$ and $|\psi b\rangle$ and the leakage error can be obtained via:

$$P_l = \frac{16g^2}{\eta + 16g^2} \sin^2\left(\frac{1}{2}\sqrt{\eta + 16g^2}\, t_p\right) \quad (38)$$

From the complete swap condition $P_{10\to 01}=1$ and Equation (36) it follows that $$t_p = \frac{\pi}{2g} \tag{39}$$

Substitution $t_p$ from Equation (39) into Equation (38) and imposing zero leakage condition $P_l=0$ yields the condition for synchronization of the errors:

$$g = \frac{\eta}{4\sqrt{n^2-1}} \tag{40}$$

where $n\geq 2$ is an integer number.

Therefore, if $\eta$ has a fixed value and $g=$const the errors cannot be synchronized at arbitrary $g$. As such, $g$ must be tunable, i.e. time-dependent. This time dependence is inherently present in some qubit realizations, e.g., Xmon qubits, and can be utilized to synchronize the errors. Even though the deviation of $g(t)$ from its initial value during execution of the gate is relatively modest (~10% or less), it is sufficient to achieve the desired synchronization and develop fast and robust qubit calibration protocol.

For convenience, a system of two capacitively coupled Xmon qubits is considered in the below analysis. The functional dependence of $g(t)$ can be derived from the original Hamiltonian describing the system of two capacitively coupled Xmon qubits in terms of charge and phase operators:

$$H = 4E_{C1}n_1^2 + 4E_{C2}n_2^2 - E_{J1}\cos(\varphi 1) - E_{J2}\cos(\varphi 2) + \frac{4e^2}{C_{\Sigma 1}C_{\Sigma 2}}n_1 n_2 \tag{41}$$

Here $n_i$ and $\varphi_i$ represent the canonically conjugate operators corresponding the number of Cooper pairs and the superconducting phase difference across the junction of $i_{th}$ qubit respectively, $[\varphi_i, n_i]=i$, $E_{Ci}=e^2/(2C_{\Sigma i})$ are the charging energies, $C_{\Sigma i}$ are total equivalent capacitances of each qubit, $C_{qq}$ is the coupling capacitance and $E_{Ji}$ are (tunable) Josephson energies controlled by external flux biases applied to qubit 1. The qubits operate in the regime of coupled anharmonic oscillators, which is defined by the inequality $E_{Ji}/E_{Ci}\gg 1$. In this regime boson creation and annihilation operators can be introduced via $$n_i = -\frac{i}{\sqrt{2}}\left(\frac{E_{Ji}}{8E_{Ci}}\right)^{1/4}(a_i - a_i^\dagger) \tag{42}$$

By using this transformation, imposing the RWA, and keeping only leading anharmonic terms the Hamiltonian in Equation (41) can be reduced to the form given by Equation (3) with the parameters identified as:

$$\omega_i(t)\cong\sqrt{8E_{Ji}(t)E_{Ci}}-E_{Ci} \tag{43}$$

$$\eta_i\cong -E_{Ci} \tag{44}$$

$$g=g(t)\cong A\sqrt{\omega_1(t)\omega_2(t)}, \tag{45}$$

where $A$ is a dimensionless constant, proportional to the coupling capacitance:

$$A = \frac{C_{qq}}{2\sqrt{C_{\Sigma 1}C_{\Sigma 2}}} \approx 0.0026 \div 0.0028 \tag{46}$$

The numerical value of $A$ is based on typical capacitances of the current Xmon qubits.

Next it is assumed that the frequencies of both qubits are moving and instantly plunge to the point $\omega_q+q\epsilon_0$, where $\omega_q$ is the frequency of the second qubit in the parking position, $0\leq q\leq 1$ and $\epsilon_0=2\pi\times 1$ GHz is the idle detuning. Equation (35) must be satisfied at the interaction frequency (meeting point), which yields $$\omega_i = \omega_1 = \omega_2 = \omega_q + q\epsilon_0 = \frac{\eta}{4A\sqrt{n^2-1}} \tag{47}$$

In typical Xmon qubits of the current generation the parking frequencies range between 4.5 and 6.5 GHz. In combination with Equation (46) for the interqubit coupling it is implied that the smallest value of n at which Equation (47) can be satisfied is n=4. For example, if $\epsilon_0=2\pi\times 1$ GHz, $\omega_q=2\pi\times 5.11$ GHz, and $\eta=2\pi\times 240$ MHz it can be found from Equation (47) that $q\approx 0.6$ and, if n=4, $\omega_i\approx 2\pi\times 5.7$ GHz falls within the interval between the two parking frequencies, i.e. the synchronization of errors is indeed possible.

Figure 9:
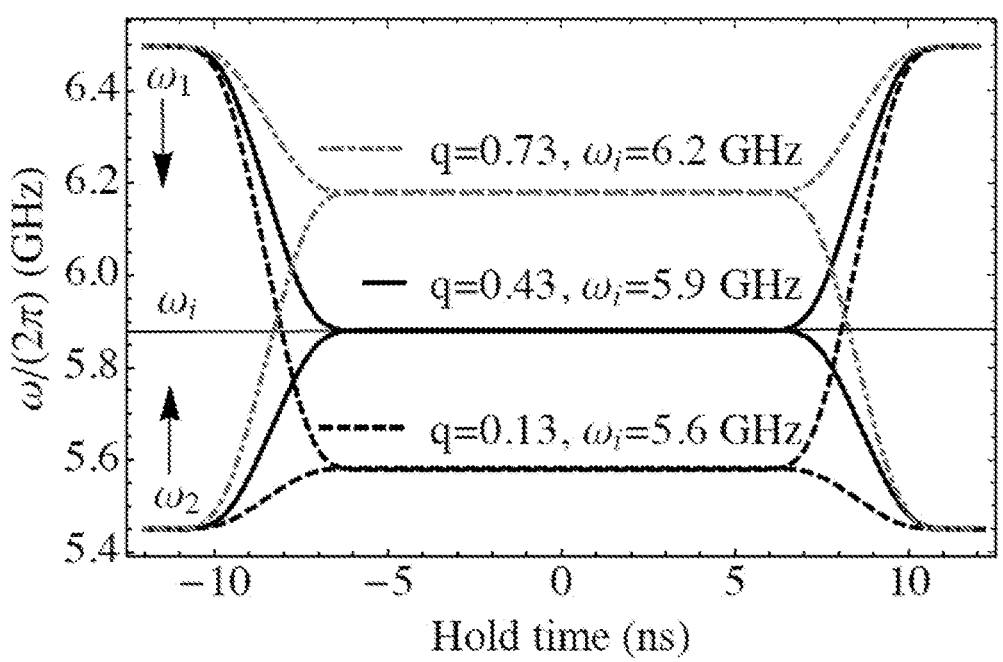
FIG. 9 shows three example schedules with different interaction frequencies.
Figure 10:
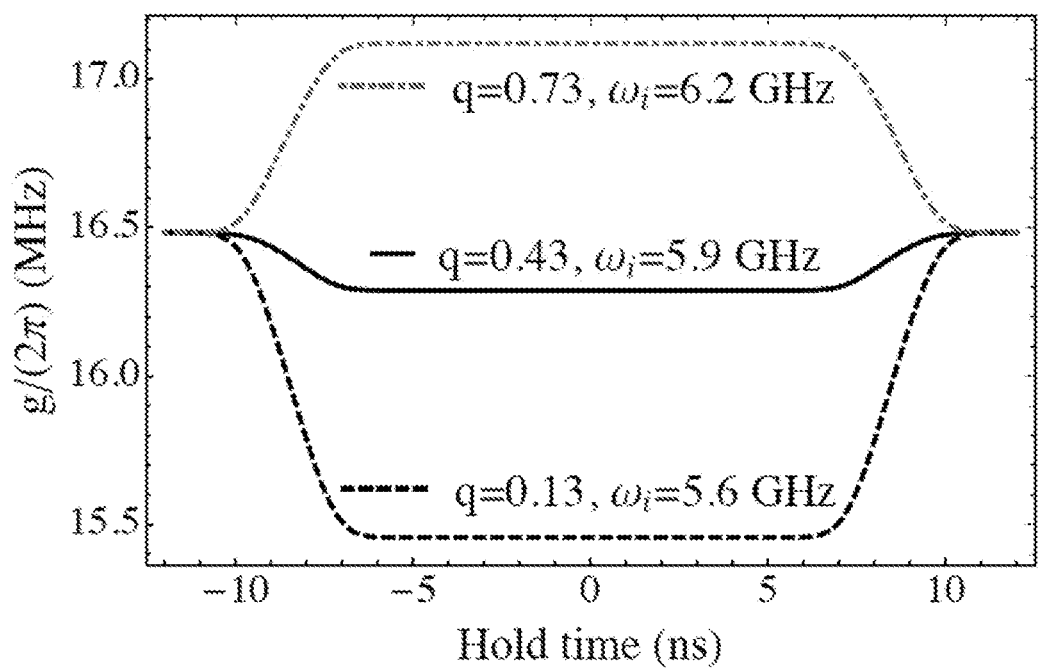
FIG. 10 shows three example values of g for different interaction frequencies.

The parameter q characterizes the asymmetry of the trajectories of the qubits with respect to their parking frequencies, i.e. q=0.5 corresponds to symmetric trajectories while q=0,1 correspond to the fixed frequencies of the qubit 1 or 2 respectively. That is why the described procedure is called "asymmetric synchronization". Typical schedules with different values of q and corresponding time-dependencies of $g(t)$ given by Equation (45) are shown in FIGS. 9 and 10 respectively.

Figure 11:
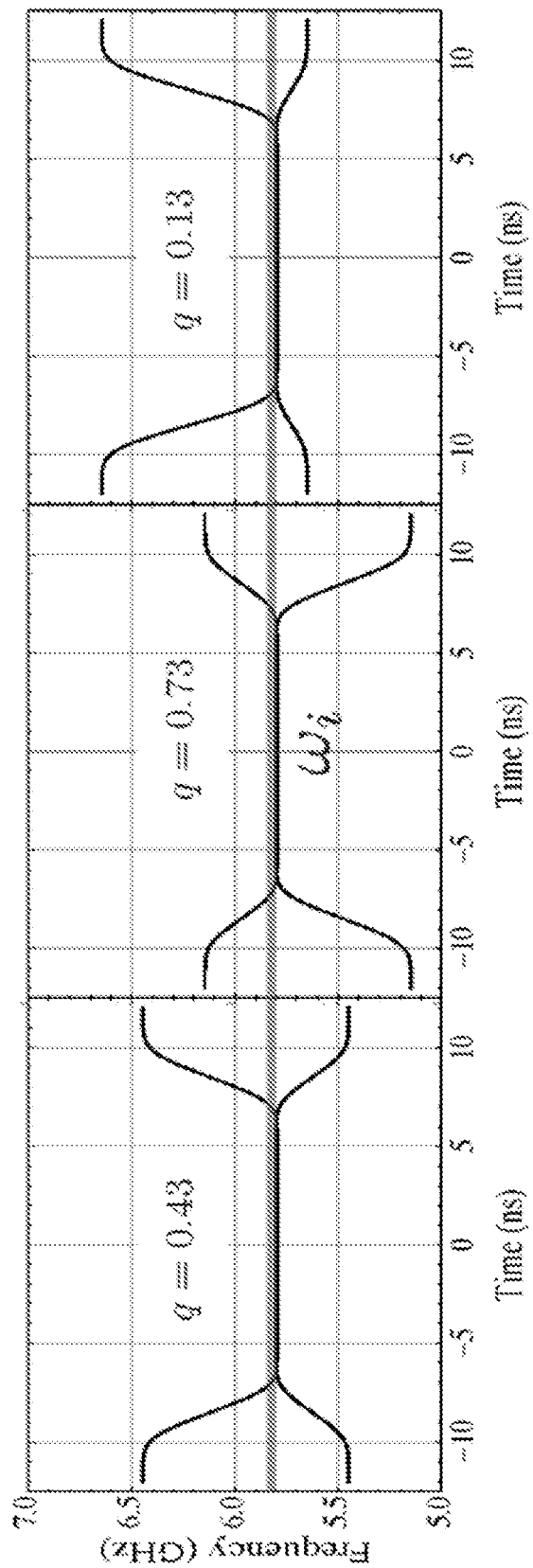
FIG. 11 shows three equivalent schedules with different q but with the same initial detuning and interaction frequency.
Figure 12:
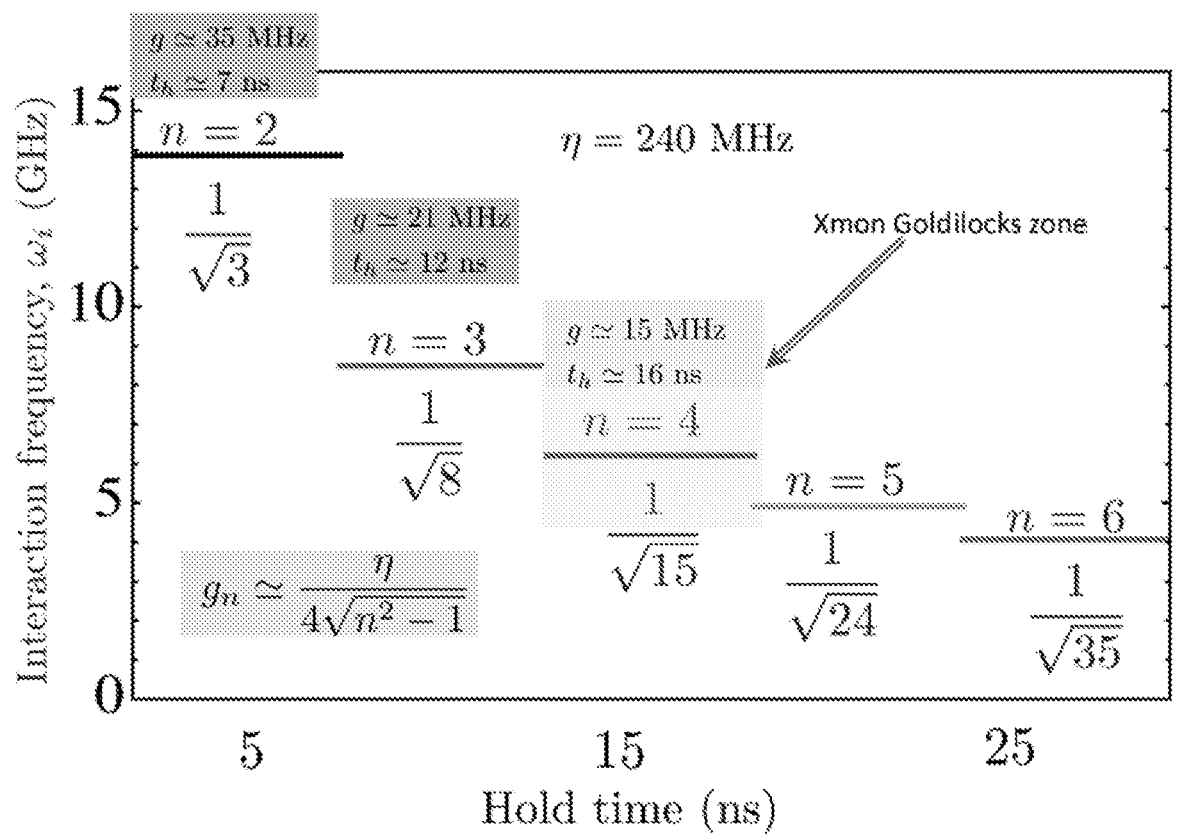
FIG. 12 shows an example spectrum of interaction frequencies of a two-qubit iSWAP gate enabled by a rectangular pulse.
Figure 13:
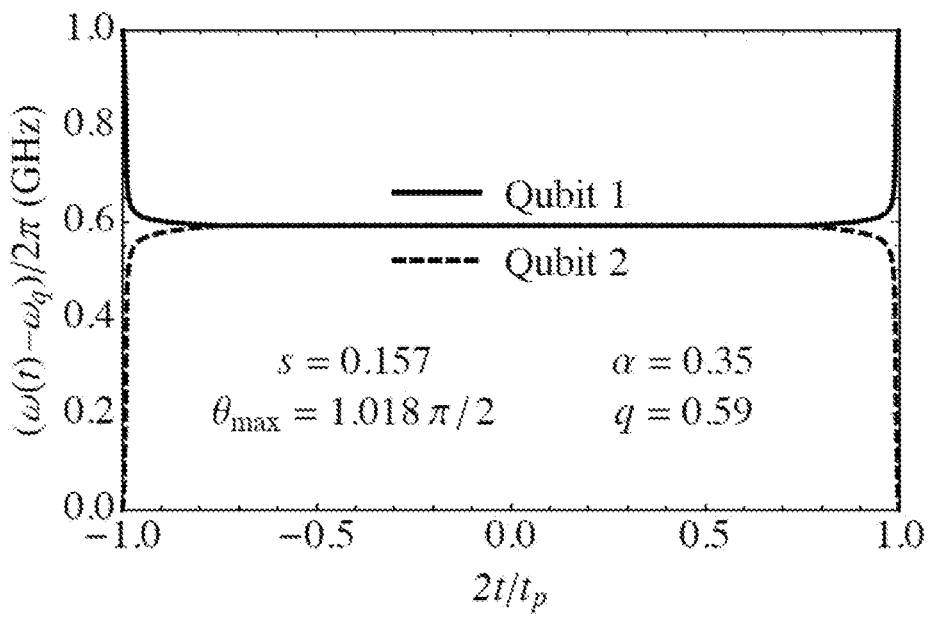
FIG. 13 shows an example Rabi plunge protocol.

It is noted that the interaction frequency $\omega_i$ rather than the asymmetry parameter q plays a fundamental role, as shown in FIG. 11. FIG. 11 shows three equivalent schedules with different q but with the same initial detuning $\epsilon_0$ and interaction frequency $\omega_i$. The interaction frequency shows that irrespectively of their parking positions the frequencies of the qubits must be tuned to one of the fixed frequencies of Equations (40). As such, these interaction frequencies can be considered as the "spectrum" of the iSWAP gate for a given qubit pair, see FIG. 12 which shows an example spectrum of interaction frequencies of the two-qubit iSWAP gate enabled by a rectangular pulse.

Equation (40) must be satisfied for any qubits with tunable coupling. For instance, to execute a complete swap and suppress leakage for $\eta=2\pi\times 240$ MHz it is required to operate close to one of these amplitudes of $g(t)$:

$$g_h \approx 2\pi \times \begin{cases} 34.6 \text{ MHz}, & n=2, \quad t_h = 7.2 \text{ ns} \\ 21.2 \text{ MHz}, & n=3, \quad t_h = 11.9 \text{ ns} \\ 15.5 \text{ MHz}, & n=4, \quad t_h = 16.1 \text{ ns} \end{cases} \tag{48}$$

Here $g_h=g(t)$ for $|t|\leq t_h/2$.

Asymmetric Synchronization Using Rabi Plunge Protocol

The time-dependence of $g(t)$ can be accounted for in the Rabi-type protocol described herein. Since in this approach the schedule is based on the dependence of the control angle $\theta$ on the natural time, the qubit frequencies and ultimately g need to be expressed through angle $\theta$. As shown below, this can be done by solving a quadratic equation for $g(\theta)$. By taking advantage of the fact that the exact solution of this problem is known, the perfect SWAP path in the parameter space is known as well. Therefore the remaining task is to minimize the leakage error along the path of the perfect SWAP.

A trapezoidal ramp function in the natural time is generated. The trapezoidal ramp function may be defined as $$f_{ramp}(x,s) = p(x,s) - p(s+x-1,s) \quad (49)$$

where $$x = \frac{\tau}{\tau_p},$$

i.e. $0 \leq x \leq 1$, and p(x,s) is an auxiliary function:

$$p(x, s) = \frac{1}{2}\left(1 - \sqrt{\delta^2 + \left(\frac{x}{s} - 1\right)^2} + \sqrt{\left(\delta^2 + \left(\frac{x}{s}\right)^2\right)}\right) \quad (50)$$

The notation $x = \tau/\tau_p$ is used in all equations below. Equations (49) and (50) describe a rounded trapezoid with $\delta$ being a parameter responsible for the smearing and rounding. The control angle can then be expressed as:

$$\theta(x) = \theta_{in} + (\theta_{max} - \theta_{in})\frac{f_{ramp}(x, s) - f_{ramp}(0, s)}{f_{ramp}\left(\frac{1}{2}, s\right) - f_{ramp}(0, s)} \quad (51)$$

where $\theta_{in} = \text{arccot}(\epsilon_0/2g_0)$. The time-dependent detuning is defined as previously:

$$\epsilon(x) = 2g(x)\cot(\theta(x)) \quad (52)$$

which is a generalization of Equation (9) to the case of time-dependent g. Likewise, the generalization of the natural time transformation given by Equations. (11) and (12) may be given by:

$$\tau(t) = (2g_0)^{-1} \int_{-\frac{t_p}{2}}^{t} \sqrt{\epsilon^2(s) + 4g^2(s)}\, ds \quad (53)$$

$$t(\tau) = g_0 \int_0^\tau \frac{\sin[\theta(\tau')]}{g(\tau')} d\tau' \quad (54)$$

By virtue of this transformation the Schrödinger equation in the SWAP channel will assume the form of Equation (14). Therefore, the solution in the natural time is completely defined by $\theta(\tau)$ irrespectively of the explicit form of g (t). The latter, however, is required to generate the map between the natural and physical times and ultimately, to generate the schedule $\epsilon(t)$ and find the leakage error. This can be accomplished as follows.

The qubit frequencies are defined as:

$$\omega_1(x) = \omega_q + q\epsilon_0 + (1-q)\epsilon(x) \quad (55)$$

$$\omega_2(x) = \omega_1(x) - \epsilon(x), \quad (56)$$

where, as previously, the asymmetry parameter q is defined through the interaction frequency $\omega_i$, initial frequency of the second qubit $\omega_q = \omega_2(0)$ and idle detuning $\epsilon_0 = \epsilon(0)$:

$$q = \frac{\omega_i - \omega_q}{\epsilon_0} \quad (57)$$

The quadratic equation for g (x) follows from Equations (45) and (52)-(56):

$$g^2(x) = A^2[\omega_q + q\epsilon_0 + 2(1-q)g(x)\cot(\theta(x))][\omega_q + q\epsilon_0 - 2qg(x)\cot(\theta(x))] \quad (58)$$

The relevant solution of this equation reads:

$$g(x) \equiv g[\theta(x)] = \frac{q\,\epsilon_0 + \omega_q}{\sqrt{\cot^2(\theta(x)) + A^{-2}} + (2q-1)\cot(\theta(x))} \quad (59)$$

The $t(\tau)$ map can be generated using Equations (51), (59), and (54):

$$t = \tau_p g_0 \int_0^{\tau/\tau_p} \frac{\sin(\theta(x))}{g(x)}, \quad (60)$$

and the inverse map $\tau(t)$ (or x(t)) can be obtained by inverting the map $t(\tau)$ generated by Equation (60) numerically. Finally, $g(t) = g[\theta(x(t))]$ and $\epsilon(t) = \epsilon[\theta(x(t))]$ can be computed using Equations (59) and (52).

Figure 14:
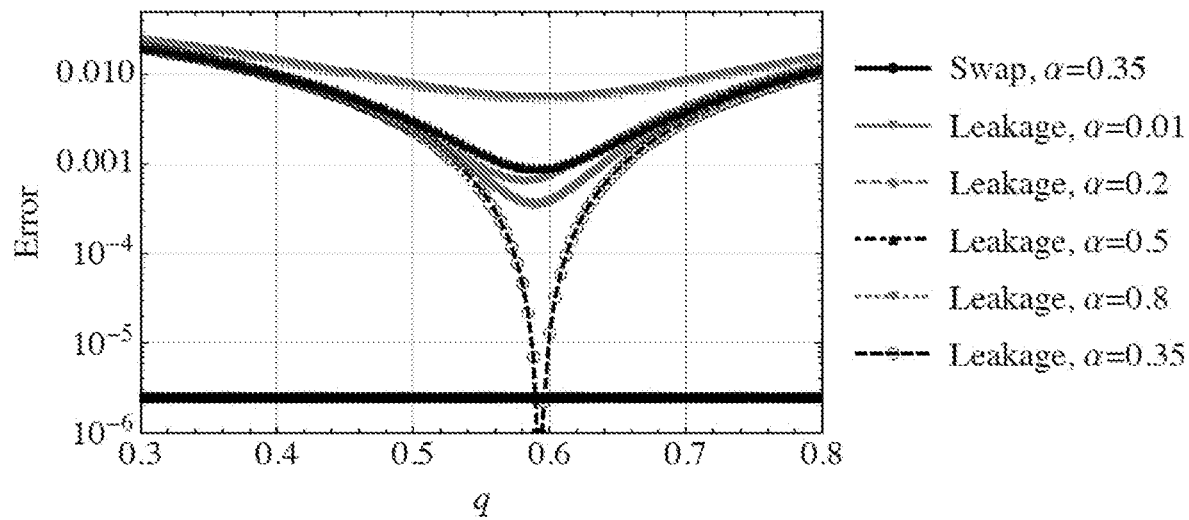
FIG. 14 shows example SWAP and leakage errors.

As described above, for ideal trapezoids $\theta(x)$ (i.e. $\delta = 0$) the exact solution $P_{01}(\alpha)$ given by Equation (25) holds irrespectively of the explicit form of g(t). This implies that Equations (27) and (28) define the path of the perfect SWAP in the plane s, $\theta_{max}$. This is indeed the case even for rounded trapezoids, as confirmed by numerical calculations with finite $\delta \leq 5 \times 10^{-2}$ in Equations (49)-(51). The SWAP and leakage errors calculated according to Equations (36) and (38) are shown in FIG. 14 as functions of the asymmetry parameter q for the Rabi schedule with $\omega_q = 5.45$ GHz, $\epsilon_0 = 1$ GHz, $\delta = 0.04$ (see FIG. 13, which shows an example Rabi plunge protocol) and the device anharmonicity parameters $\eta_1 = 246$ MHz and $\eta_2 = 242$ MHz for qubits 1 and 2 respectively.

Figure 15:
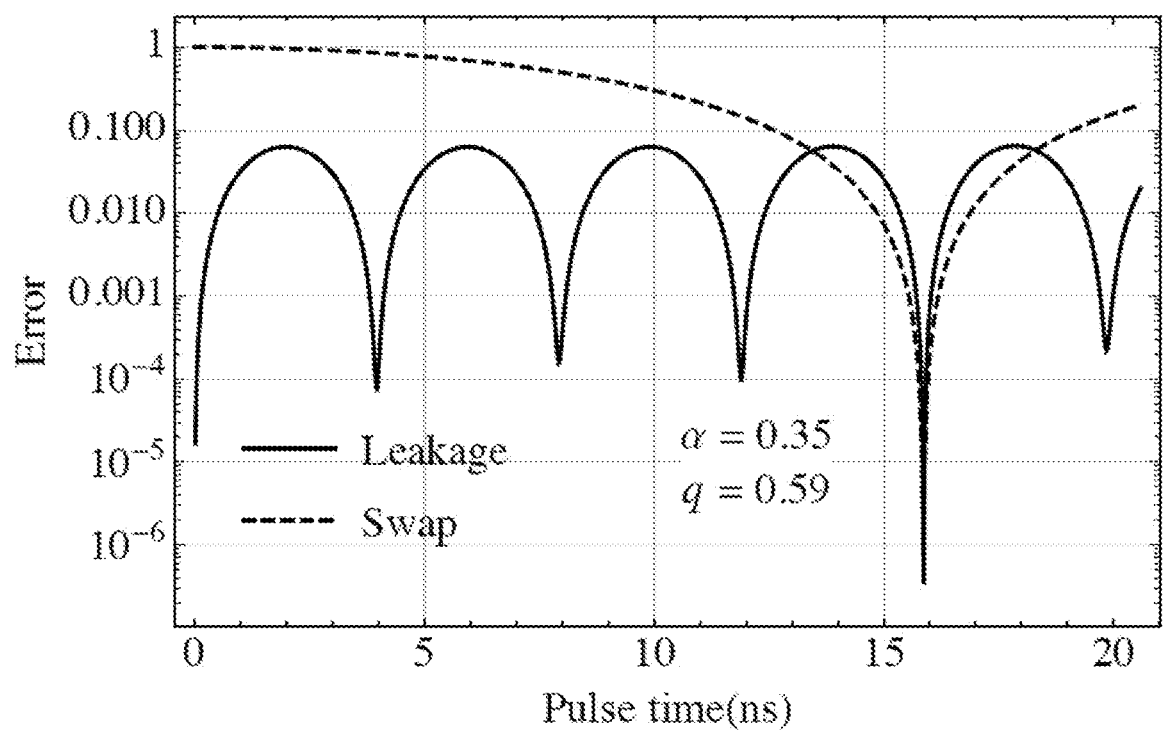
FIG. 15 shows the swap and leakage errors as functions of the gate time.

The errors have been calculated for different $\alpha$ in the interval $0 \leq \alpha \leq 1$ with $\theta_{max}(\alpha)$ and $s(\alpha)$ prescribed by Equations (27) and (28) respectively. The SWAP errors, $P_s(\alpha, q)$ are below $10^{-5}$ for all $\alpha < 0.5$ and are virtually q-independent, i.e. this is indeed the line of the close-to-perfect SWAP in spite of the finite $\delta$. All the leakage curves display minima near $q \approx 0.6$, as expected from the procedure of asymmetric synchronization. The curve with $\alpha = 0.35$ has the most pronounced minimum with $P_l \sim 10^{-6}$ at $q = 0.59$. Therefore, the parameters $q = 0.59$ and $\alpha = 0.35$ define the optimized schedule with both $P_s$ and $P_l$ below $10^{-5}$. FIG. 15 shows the swap and leakage errors as functions of the gate time. As expected, the synchronization occurs at the fourth zero of the leakage error and the gate time is very short ~16 ns. To summarize it is noted that the Rabi plunge protocol enables a very fast, high-fidelity iSWAP gate amenable to the asymmetric synchronization of the swap and leakage errors, however its practical implementation could be challenging due to the limited bandwidth of the control electronics.

Automatic Calibration Protocol

The presently described asymmetric synchronization process can be applied to a broader class of schedules that are suitable for immediate implementation with current quantum computing hardware. The iSWAP optimization algorithm proposed in this specification relies on rounded-trapezoid pulse shapes for detuning $\epsilon(t)$ combined with the synchronization procedure described above. The resulting automatic calibration protocol does not require human intervention and can be readily implemented with currently available quantum hardware, e.g., Xmon qubits and control electronics.

Figure 16:
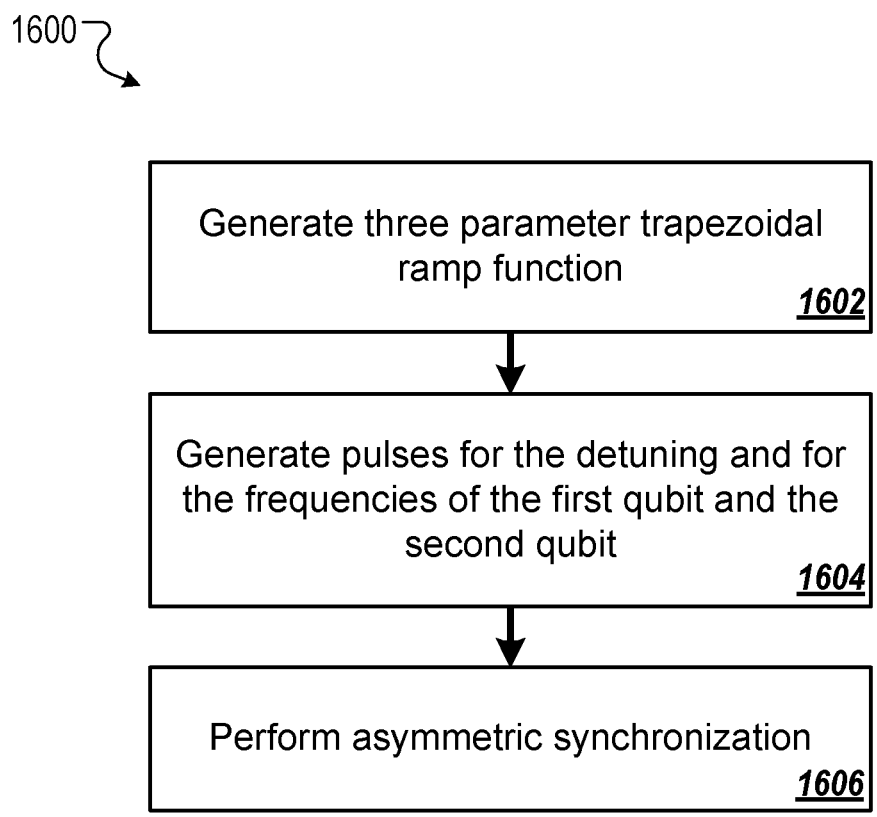
FIG. 16 is a flow diagram of an example process for generating a plunge schedule.

FIG. 16 is a flow diagram of an example automatic calibration process 1600. For convenience, the process 1600 will be described as being performed by quantum hardware in communication with control electronics located in one or more locations. For example, the system 100 of FIG. 1, appropriately programmed in accordance with this specification, can perform the process 1600.

A three-parameter trapezoidal ramp function is generated (step 1602). For example the three-parameter trapezoidal ramp function may be given by $$f_{ramp}(t) = f(t) + f(-t), \quad (61)$$

where $$f(t) = \frac{2t + t_h + 2t_r}{4t_r} \text{erf}\left(\frac{2t + t_h + 2t_r}{2\sqrt{2}\sigma}\right) - \frac{2t + t_h}{4t_r} \text{erf}\left(\frac{2t + t_h}{2\sqrt{2}\sigma}\right) + \sqrt{\frac{1}{2\pi}} \frac{\sigma}{t_r} \left[\exp\left(-\frac{(2t + t_h + 2t_r)^2}{8\sigma^2}\right) - \exp\left(-\frac{(2t + t_h)^2}{8\sigma^2}\right)\right] \quad (62)$$

The pulse shape described by Eqs. (61) and (62) is a convolution of an ideal trapezoid with the Gaussian filter function. The trapezoid is characterized by the rise time (ramp-up time) $t_r$ and the hold time $t_h$ as shown in FIG. 8 (a). The parameter $\sigma$ is the variance of the Gaussian filter in the time domain, which is uniquely related to its cutoff frequency (or bandwidth):

$$\sigma = \frac{\sqrt{\ln 2}}{2\pi f_c}, \quad (63)$$

where $f_c$ is the cutoff frequency of the 3 db Gaussian filter, e.g. $\sigma=0.55$ ns of the 3 db filter with $f_c=240$ MHz.

Pulses for the detuning and for the frequencies of the qubits 1 and 2 are generated (step 1604). For example, the pulses may be given by $$\epsilon(t) = \epsilon_0[1 - f_{ramp}(t)] - \mu f_{ramp}(t) \quad (64)$$

$$\omega_2(t) = \omega_q + \left(\omega_i + \frac{\mu}{2} - \omega_q\right) f_{ramp}(t) \quad (65)$$

$$\omega_1(t) = \omega_2(t) + \epsilon(t) \quad (66)$$

Where $\mu$ is the overshoot frequency equal to the difference between the frequencies of the qubits 2 and 1 during the hold time interval (see FIG. 8).

Asymmetric synchronization of the leakage and SWAP errors by adjusting the interaction frequency (where the trajectories of the first qubit and second qubit meet) $\omega_i$, hold time $t_h$, and overshoot frequency $\mu$ is performed (step 1606). This adjustment procedure is at core of the automatic protocol as it achieves the synchronization via minimization of the cost function $$P(\omega_i, t_r, t_h, \mu) = P_l(\omega_i, t_r, t_h, \mu) + P_s(\omega_i, t_r, t_h, \mu) \quad (67)$$

The minimization is achieved by taking a sequence of two-dimensional scans in the space of parameters. More specifically, the following steps may be performed:

Scan $\omega_i$–$t_h$ (interaction frequency-hold time) with $\mu$=const taken as an initial guess. When the scan is performed the cost function in Equation (67) is calculated at each point of a two-dimensional grid (representing $\omega_i$–$t_h$ for a range of values of $\omega_i$ and $t_h$) using Equations. (30)-(33). The scan can be performed using numerical simulation, or measurements corresponding to different values of $\omega_i$ and $t_h$ (with other parameters taking constant values) can be performed to determine corresponding values of the cost function. After the scan the minimum of the cost function can be identified and a parameter $t_h$ corresponding to the identified minimum can be updated while a new value $\omega_i$ can be used to narrow the range of $\omega_i$ in the next scan.

It is instructive to consider this scan for a rectangular pulse. Since $g=A\omega_i$ the minimum of the cost function would correspond to the intersection of the swap line and a leakage fringe line (see the left upper and lower panels of FIG. 17, which shows a sequence of scans implementing automatic calibration protocol. The bright lines correspond to the minima of the cost function. For visualization purposes the data in the density plots are plotted in the logarithmic scale to create sharper images). The equations of these lines read:

$$\omega_i = \frac{\pi}{2At_h} \quad (68)$$

$$t_h = \frac{2\pi n}{\sqrt{\eta^2 + 16A^2 \omega_i^2}} \quad (69)$$

and finding the intersection would lead to Equation (47).

Scan $\omega_i$–$\mu$ (interaction frequency-overshoot frequency). As described above, the scan can be performed using numerical simulation or measurements can be performed. The value of $\omega_i$ is updated and the new value of $\mu$ is used to narrow the range of $\mu$ in the next scan.

Scan $t_h$–$\mu$ (hold time-overshoot frequency). As described above, the scan can be performed using numerical simulation or measurements can be performed. The value of $\mu$ is updated. This is the end of the cycle and the values of all three parameters are updated.

Repeat the cycle as needed until convergence is reached. The convergence can be checked after each iteration, i.e. completion of each cycle is not required. In all simulations of the iSWAP gate with typical Xmon parameters the number of cycles never exceeded 2.

Optionally, hardware testing and optimization using randomized benchmarking may also be performed (step 1608), e.g., adjustments that further increase the iSWAP gate fidelity.

Figure 17:
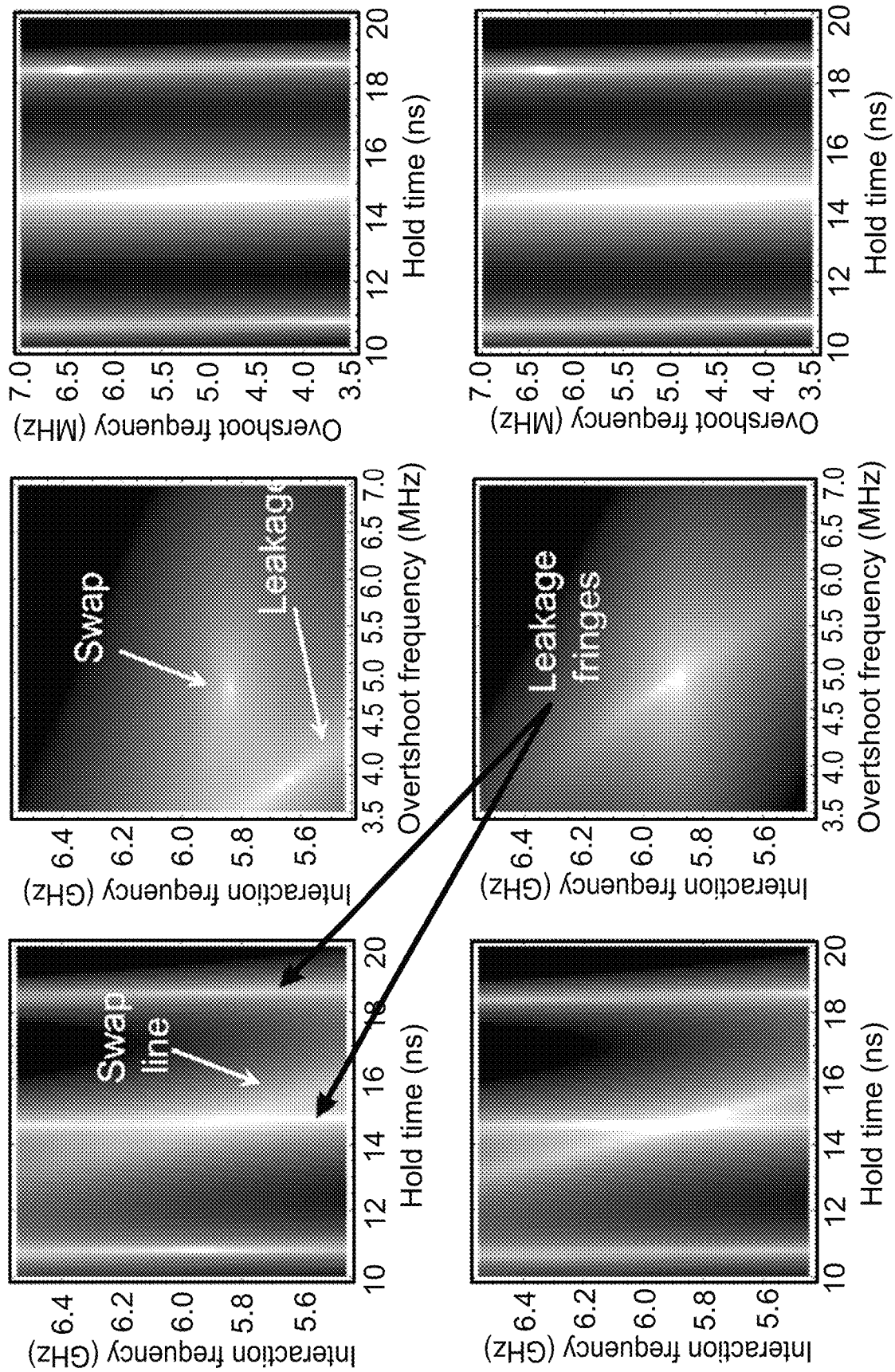
FIG. 17 shows a sequence of scans implementing an automatic calibration protocol.

A visual example of the simulated converged protocol is shown in FIG. 17 for $\omega_q=5.45$ GHz, $t_r=2.5$ ns, $\epsilon_0=1$ GHz and $\sigma=0.55$ ns ($f_c=240$ MHz). The returned optimal values of the parameters are: $\omega_i=5.88$ GHz, $\mu=4.68$ MHz and $t_h=14.9$ ns. The gate time $t_p=t_h+2t_r+6\sigma=23.26$ ns and the SWAP and leakage errors are $P_s=4.4\times10^{-6}$ and $P_l=1.99\times10^{-5}$ respectively. In some cases the two-dimensional scans can be replaced with one-dimensional plots of the type shown in FIG. 17, which clearly demonstrates the idea of the asymmetric synchronization, i.e. alignment of the minima when the qubit frequencies are tuned to the optimal value of $\omega_i$.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for implementing an iSWAP quantum logic gate between a first qubit and a second qubit, the method comprising:
   implementing a plunge schedule that defines a trajectory of a detuning between a frequency of the first qubit and a frequency of the second qubit, comprising:
      during a first stage, non-adiabatically driving the detuning between the frequency of the first qubit and the frequency of the second qubit through a first avoided crossing in a leakage channel;
      during a second stage, driving the detuning between the frequency of the first qubit and the frequency of the second qubit through a second avoided crossing in a swap channel;
      during a third stage, allowing the first qubit and the second qubit to freely evolve and interact;
      during a fourth stage, implementing the second stage in reverse order; and
      during a fifth stage, implementing the first stage in reverse order.

2. The method of claim 1, wherein the plunge schedule is based on a trapezoidal ramp function characterized by a ramp-up time, hold time and a variance of a Gaussian filter function.

3. The method of claim 1, further comprising generating the plunge schedule, comprising:
   determining a pulse for:
      the detuning between the frequency of the first qubit and the frequency of the second qubit,
      the frequency of the first qubit, and
      the frequency of the second qubit.

4. The method of claim 3, wherein generating the plunge schedule further comprises synchronizing errors in the swap channel and the leakage channel.

5. The method of claim 4, wherein synchronizing errors in the swap channel and leakage channel comprises determining a trajectory of the detuning between the frequency of the first qubit and the frequency of the second qubit for a complete population swap and minimizing the leakage channel error for that trajectory via a time-dependent inter-qubit interaction strength.

6. The method of claim 5, wherein the inter-qubit interaction strength is directly proportional to a square root of a product of the frequency of the first qubit and the frequency of the second qubit.

7. The method of claim 4, wherein synchronizing errors in the swap channel and the leakage channel comprises adjusting:
   an interaction frequency that represents a frequency where a frequency trajectory of the first qubit and a frequency trajectory of the second qubit meet,
   a hold time, and
   an overshoot frequency equal to a difference between the frequency of the first qubit and the second qubit during the hold time,
to minimize a cost function comprising a probability of a leakage error added to a probability of a swap error.

8. The method of claim 7, wherein adjusting the interaction frequency, hold time and overshoot frequency to minimize the cost function comprises repeatedly, until it is determined that a value of the cost function is converging to a minimum value:
scanning an interaction frequency-hold time with an overshoot frequency constant;
scanning an interaction frequency-overshoot frequency; and
scanning a hold time-overshoot frequency.

9. The method of claim 8, further comprising adjusting the generated schedule using randomized benchmarking to increase iSWAP gate fidelity.

10. The method of claim 3, wherein the pulse determined for the frequency of the first qubit is equal to a sum of the determined pulse for the second qubit added to the determined pulse for the detuning.

11. The method of claim 10, wherein the frequency of the first qubit is dependent on an asymmetry parameter that is equal to a difference between an interaction frequency minus an initial frequency of second qubit, divided by an idling detuning.

12. The method of claim 3, wherein the pulse determined for the frequency of the second qubit is equal to $$\omega_2(t) = \omega_q + \left(\omega_i + \frac{\mu}{2} - \omega_q\right)$$

$f_{ramp}(t)$ where $\omega_q$ represents an initial frequency of the second qubit, $\omega_i$ represents an interaction frequency, $\mu$ represents an overshoot frequency and $f_{ramp}(t)$ represents a trapezoidal ramp function.

13. The method of claim 3, wherein the determined pulse for the detuning is equal to $\epsilon(t)=\epsilon_0 1-f_{ramp}(t)] -\mu f_{ramp}(t)$ where $\epsilon_0$ represents an initial detuning between the frequency of the first qubit and the frequency of the second qubit, $\mu$ represents an overshoot frequency and $f_{ramp}(t)$ represents a trapezoidal ramp function.

14. The method of claim 1, wherein allowing the first qubit and the second qubit to freely evolve and interact comprises allowing the first qubit and second qubit to freely evolve and interact within a predetermined distance from 10-01 resonance to enable a population swap.

15. The method of claim 1, wherein driving the detuning between the frequency of the first qubit and the frequency of the second qubit through a second avoided crossing in a swap channel comprises adiabatically driving the detuning between the frequency of the first qubit and the frequency of the second qubit through a second avoided crossing in a swap channel.

16. The method of claim 1, wherein the first qubit and second qubit comprise capacitively coupled Xmon qubits.

17. The method of claim 1, wherein the leakage channel comprises a manifold spanned by the computational state 11 and two non-computational states 02 and 20, and wherein driving the detuning between the frequency of the first qubit and the frequency of the second qubit through a first avoided crossing in a leakage channel comprises driving the detuning between the frequency of the first qubit and the frequency of the second qubit through state 11-20 resonance.

18. The method of claim 1, wherein the swap channel comprises a manifold spanned by the computational states 10 and 01, and wherein driving the detuning between the frequency of the first qubit and the frequency of the second qubit through a second avoided crossing in a swap channel comprises driving the detuning between the frequency of the first qubit and the frequency of the second qubit through state 10-01 resonance.

19. The method of claim 1, wherein implementing the second stage in reverse order comprises driving the detuning between the frequency of the first qubit and the frequency of the second qubit to achieve a complete population swap between the qubit states 10 and 01.

20. An apparatus comprising:
a first qubit;
a second qubit coupled to the first qubit;
control electronics comprising one or more control devices that tune a frequency of the first qubit and second qubit through application of respective control signals,
wherein the control electronics are configured to implement a plunge schedule that defines a trajectory of a detuning between a frequency of the first qubit and a frequency of the second qubit, comprising:
during a first stage, non-adiabatically driving the detuning between the frequency of the first qubit and the frequency of the second qubit through a first avoided crossing in a leakage channel;
during a second stage, driving the detuning between the frequency of the first qubit and the frequency of the second qubit through a second avoided crossing in a swap channel;
during a third stage, allowing the first qubit and the second qubit to freely evolve and interact;
during a fourth stage, implementing the second stage in reverse order; and
during a fifth stage, implementing the first stage in reverse order.

* * * * *